United States Patent
Traw et al.

(10) Patent No.: US 8,943,540 B2
(45) Date of Patent: Jan. 27, 2015

(54) METHOD AND APPARATUS TO PROVIDE A PERSONALIZED CHANNEL

(75) Inventors: Brendan Traw, Portland, OR (US);
Bruce D. Bridges, Louisville, KY (US);
Stephen P. Balogh, Portland, OR (US);
Jay H. Connelly, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1424 days.

(21) Appl. No.: 12/175,909

(22) Filed: Jul. 18, 2008

(65) Prior Publication Data

US 2009/0037958 A1 Feb. 5, 2009

Related U.S. Application Data

(63) Continuation-in-part of application No. 09/966,676, filed on Sep. 28, 2001, now abandoned.

(51) Int. Cl.
*H04N 7/173* (2011.01)
*H04N 5/445* (2011.01)
(Continued)

(52) U.S. Cl.
CPC ......... *H04N 21/435* (2013.01); *H04N 21/4532* (2013.01); *H04N 21/458* (2013.01); *H04N 21/252* (2013.01); *H04N 21/4667* (2013.01);
(Continued)

(58) Field of Classification Search
CPC . H04N 21/4756; H04N 21/466; H04N 21/40; H04N 21/4432; H04N 21/25866
USPC ............. 725/26, 28, 46, 132, 140, 152; 713/2
See application file for complete search history.

(56) References Cited

U.S. PATENT DOCUMENTS

| 4,115,855 A | 9/1978 | Chiba |
| 4,546,382 A | 10/1985 | McKenna et al. |

(Continued)

FOREIGN PATENT DOCUMENTS

| EP | 0064168 | 11/1982 |
| EP | 0902569 | 3/1999 |

(Continued)

OTHER PUBLICATIONS

Non-Final Office Action for U.S. Appl. No. 09/966,676 mailed Aug. 23, 2006, 11 pages.

(Continued)

*Primary Examiner* — Pankaj Kumar
*Assistant Examiner* — Reuben M Brown
(74) *Attorney, Agent, or Firm* — Blakely, Sokoloff, Taylor & Zafman LLP

(57) ABSTRACT

A method and apparatus for automatically delivering data files (e.g. television and movies) via a personalized channel to a user, that are based on a user's profile and viewing habits, are provided. A client receives meta-data broadcasts from a server system that includes descriptions of a plurality of data files currently being broadcasted or to be broadcast by the server system. In response to a content rating table that is based on a user's profile and viewing habits, a data file is automatically selected. The selected data file is displayed on a personalized channel on a display device to the user. The selected data file can be, for example, a currently broadcasting data file or a data file stored in a cache memory of the client. Thus, the user only needs to tune to his or her personalized channel to view personalized content.

11 Claims, 10 Drawing Sheets

(51) Int. Cl.

| | | |
|---|---|---|
| *G06F 13/00* | (2006.01) | |
| *H04N 21/45* | (2011.01) | |
| *H04N 21/435* | (2011.01) | |
| *H04N 21/458* | (2011.01) | |
| *H04N 21/25* | (2011.01) | |
| *H04N 21/466* | (2011.01) | |
| *H04N 21/235* | (2011.01) | |
| *H04N 21/84* | (2011.01) | |
| *H04N 21/442* | (2011.01) | |
| *H04N 21/61* | (2011.01) | |
| *H04N 21/2668* | (2011.01) | |
| *H04N 21/433* | (2011.01) | |
| *H04N 21/658* | (2011.01) | |
| *H04N 7/167* | (2011.01) | |
| *G06F 3/00* | (2006.01) | |

(52) U.S. Cl.
CPC ............ *H04N 21/235* (2013.01); *H04N 21/84* (2013.01); *H04N 21/44222* (2013.01); *H04N 21/442* (2013.01); *H04N 21/6112* (2013.01); *H04N 21/2668* (2013.01); *H04N 21/4331* (2013.01); *H04N 21/4586* (2013.01); *H04N 21/6582* (2013.01)
USPC .............................................. 725/46; 725/28

(56) References Cited

U.S. PATENT DOCUMENTS

| | | |
|---|---|---|
| 4,566,030 A | 1/1986 | Nickerson et al. |
| 4,602,279 A | 7/1986 | Freeman |
| 4,624,578 A | 11/1986 | Green |
| 4,646,145 A | 2/1987 | Percy et al. |
| 4,695,879 A | 9/1987 | Weinblatt |
| 5,075,771 A | 12/1991 | Hashimoto |
| 5,155,591 A | 10/1992 | Wachob |
| 5,175,836 A | 12/1992 | Morgan |
| 5,227,874 A | 7/1993 | Von Kohorn |
| 5,303,234 A | 4/1994 | Kou |
| 5,357,276 A | 10/1994 | Banker et al. |
| 5,388,211 A | 2/1995 | Hornbuckle |
| 5,392,223 A | 2/1995 | Caci |
| 5,408,465 A | 4/1995 | Gusella et al. |
| 5,410,272 A | 4/1995 | Haberland et al. |
| 5,410,344 A | 4/1995 | Graves et al. |
| 5,426,513 A | 6/1995 | Scorse et al. |
| 5,444,499 A | 8/1995 | Saitoh |
| 5,446,919 A | 8/1995 | Wilkins |
| 5,457,808 A | 10/1995 | Osawa et al. |
| 5,483,278 A | 1/1996 | Strubbe et al. |
| 5,483,529 A | 1/1996 | Baggen et al. |
| 5,517,254 A | 5/1996 | Monta et al. |
| 5,530,082 A | 6/1996 | Friebe et al. |
| 5,530,965 A | 6/1996 | Kawasaki |
| 5,534,911 A | 7/1996 | Levitan |
| 5,541,638 A | 7/1996 | Story |
| 5,544,161 A | 8/1996 | Bigham et al. |
| 5,550,928 A | 8/1996 | Lu et al. |
| 5,559,549 A | 9/1996 | Hendricks et al. |
| 5,563,895 A | 10/1996 | Malkamaki et al. |
| 5,564,088 A | 10/1996 | Saitoh |
| 5,566,174 A | 10/1996 | Sato et al. |
| 5,568,181 A | 10/1996 | Greenwood et al. |
| 5,574,509 A | 11/1996 | Citta et al. |
| 5,583,561 A | 12/1996 | Baker et al. |
| 5,583,576 A | 12/1996 | Perlman et al. |
| 5,585,838 A | 12/1996 | Lawler et al. |
| 5,594,490 A | 1/1997 | Dawson et al. |
| 5,600,364 A | 2/1997 | Hendricks et al. |
| 5,600,573 A | 2/1997 | Hendricks et al. |
| 5,600,606 A | 2/1997 | Rao |
| 5,619,247 A | 4/1997 | Russo |
| 5,619,249 A | 4/1997 | Billock et al. |
| 5,648,824 A | 7/1997 | Dunn et al. |
| 5,652,870 A | 7/1997 | Yamasaki et al. |
| 5,654,747 A | 8/1997 | Ottesen et al. |
| 5,664,091 A | 9/1997 | Keen |
| 5,666,293 A | 9/1997 | Metz et al. |
| 5,680,322 A | 10/1997 | Shinoda |
| 5,686,954 A | 11/1997 | Yoshinobu et al. |
| 5,689,439 A | 11/1997 | Weerackody et al. |
| 5,701,599 A | 12/1997 | Aihara |
| 5,717,814 A | 2/1998 | Abecassis |
| 5,717,923 A | 2/1998 | Dedrick |
| 5,724,345 A | 3/1998 | Guarneri et al. |
| 5,724,543 A | 3/1998 | Ozden et al. |
| 5,727,002 A | 3/1998 | Miller et al. |
| 5,732,282 A | 3/1998 | Provino et al. |
| 5,734,890 A | 3/1998 | Case et al. |
| 5,740,549 A | 4/1998 | Reilly et al. |
| 5,751,282 A | 5/1998 | Girard et al. |
| 5,752,160 A | 5/1998 | Dunn |
| 5,754,938 A | 5/1998 | Herz et al. |
| 5,758,257 A * | 5/1998 | Herz et al. .................... 725/116 |
| 5,758,259 A | 5/1998 | Lawler |
| 5,768,681 A | 6/1998 | Dan et al. |
| 5,778,182 A | 7/1998 | Cathey et al. |
| 5,790,170 A | 8/1998 | Suzuki |
| 5,790,935 A | 8/1998 | Payton |
| 5,801,747 A | 9/1998 | Bedard |
| 5,801,753 A | 9/1998 | Eyer et al. |
| 5,815,662 A | 9/1998 | Ong |
| 5,838,668 A | 11/1998 | Okada et al. |
| 5,838,678 A | 11/1998 | Davis et al. |
| 5,842,199 A | 11/1998 | Miller et al. |
| 5,845,090 A | 12/1998 | Collins et al. |
| 5,848,396 A | 12/1998 | Gerace |
| 5,867,226 A | 2/1999 | Wehmeyer et al. |
| 5,867,799 A | 2/1999 | Lang et al. |
| 5,872,588 A | 2/1999 | Aras et al. |
| 5,897,608 A | 4/1999 | Yokoyama et al. |
| 5,903,314 A | 5/1999 | Niijima et al. |
| 5,905,713 A | 5/1999 | Anderson et al. |
| 5,918,002 A | 6/1999 | Klemets et al. |
| 5,918,022 A | 6/1999 | Batz et al. |
| 5,920,642 A | 7/1999 | Merjanian |
| 5,920,700 A | 7/1999 | Gordon et al. |
| 5,926,230 A | 7/1999 | Niijima et al. |
| 5,928,330 A | 7/1999 | Goetz et al. |
| 5,930,493 A | 7/1999 | Ottesen et al. |
| 5,937,411 A | 8/1999 | Becker |
| 5,940,073 A | 8/1999 | Klosterman et al. |
| 5,940,738 A | 8/1999 | Rao |
| 5,945,988 A | 8/1999 | Williams et al. |
| 5,963,551 A | 10/1999 | Minko |
| 5,973,683 A | 10/1999 | Cragun et al. |
| 5,974,398 A | 10/1999 | Hanson et al. |
| 5,977,964 A | 11/1999 | Williams et al. |
| 5,978,381 A | 11/1999 | Perlman et al. |
| 5,983,214 A | 11/1999 | Lang et al. |
| 5,991,735 A | 11/1999 | Gerace |
| 5,991,841 A | 11/1999 | Gafken et al. |
| 5,999,526 A | 12/1999 | Garland et al. |
| 5,999,908 A | 12/1999 | Abelow |
| 6,002,393 A | 12/1999 | Hite et al. |
| 6,002,852 A | 12/1999 | Birdwell et al. |
| 6,005,597 A | 12/1999 | Barrett et al. |
| 6,006,247 A | 12/1999 | Browning et al. |
| 6,012,051 A | 1/2000 | Sammon, Jr. |
| 6,018,359 A | 1/2000 | Kermode et al. |
| 6,018,768 A | 1/2000 | Ullman et al. |
| 6,020,883 A | 2/2000 | Herz et al. |
| 6,021,433 A | 2/2000 | Payne et al. |
| 6,025,868 A | 2/2000 | Russo |
| 6,028,685 A | 2/2000 | Caridi et al. |
| 6,029,045 A | 2/2000 | Picco et al. |
| 6,029,176 A | 2/2000 | Cannon |
| 6,055,560 A | 4/2000 | Mills et al. |
| 6,057,872 A | 5/2000 | Candelore |
| 6,067,564 A | 5/2000 | Urakoshi et al. |
| 6,075,971 A | 6/2000 | Williams et al. |
| 6,085,252 A | 7/2000 | Zhu et al. |
| 6,085,253 A | 7/2000 | Blackwell et al. |

(56) References Cited

U.S. PATENT DOCUMENTS

| | | |
|---|---|---|
| 6,088,722 A | 7/2000 | Herz et al. |
| 6,108,645 A | 8/2000 | Eichstaedt et al. |
| 6,114,376 A | 9/2000 | Prichard et al. |
| 6,118,492 A | 9/2000 | Milnes |
| 6,119,189 A | 9/2000 | Gafken et al. |
| 6,125,259 A | 9/2000 | Perlman |
| 6,131,127 A | 10/2000 | Gafken et al. |
| 6,141,785 A | 10/2000 | Hur et al. |
| 6,144,376 A | 11/2000 | Connelly |
| 6,148,005 A | 11/2000 | Paul et al. |
| 6,160,989 A | 12/2000 | Hendricks et al. |
| 6,163,316 A | 12/2000 | Killian |
| 6,169,570 B1 | 1/2001 | Suzuki |
| 6,177,931 B1 | 1/2001 | Alexander et al. |
| 6,184,918 B1 | 2/2001 | Goldschmidt Iki et al. |
| 6,185,360 B1 | 2/2001 | Inoue et al. |
| 6,215,776 B1 | 4/2001 | Chao |
| 6,226,618 B1 | 5/2001 | Downs |
| 6,233,283 B1 | 5/2001 | Chiu et al. |
| 6,236,395 B1 | 5/2001 | Sezan et al. |
| 6,240,553 B1 | 5/2001 | Son et al. |
| 6,271,893 B1 | 8/2001 | Kawaguchi et al. |
| 6,279,040 B1 | 8/2001 | Ma et al. |
| 6,289,012 B1 | 9/2001 | Harrington et al. |
| 6,289,510 B1 | 9/2001 | Nakajima |
| 6,298,482 B1 | 10/2001 | Seidman et al. |
| 6,304,578 B1 | 10/2001 | Fluss |
| 6,317,881 B1 | 11/2001 | Shah-Nazaroff et al. |
| 6,320,850 B1 | 11/2001 | Perahia et al. |
| 6,324,182 B1 | 11/2001 | Burns et al. |
| 6,324,338 B1 | 11/2001 | Wood et al. |
| 6,349,321 B1 | 2/2002 | Katayama |
| 6,357,028 B1 | 3/2002 | Zhu |
| 6,357,042 B2 | 3/2002 | Srinivasan et al. |
| 6,359,557 B2 | 3/2002 | Bilder |
| 6,359,571 B1 | 3/2002 | Endo et al. |
| 6,374,405 B1 | 4/2002 | Willard |
| 6,378,036 B2 | 4/2002 | Lerman et al. |
| 6,389,593 B1 | 5/2002 | Yamagishi |
| 6,397,387 B1 | 5/2002 | Rosin et al. |
| 6,424,625 B1 | 7/2002 | Larsson et al. |
| 6,430,608 B1 | 8/2002 | Shaio |
| 6,434,747 B1 | 8/2002 | Khoo et al. |
| 6,438,579 B1 | 8/2002 | Hosken |
| 6,438,585 B2 | 8/2002 | Mousseau et al. |
| 6,445,398 B1 | 9/2002 | Gerba et al. |
| 6,449,632 B1 | 9/2002 | David et al. |
| 6,449,654 B1 | 9/2002 | Blackwell et al. |
| 6,457,010 B1 | 9/2002 | Eldering et al. |
| 6,459,427 B1 | 10/2002 | Mao et al. |
| 6,460,036 B1 | 10/2002 | Herz et al. |
| 6,463,585 B1 | 10/2002 | Hendricks et al. |
| 6,467,089 B1 | 10/2002 | Aust et al. |
| 6,477,704 B1 | 11/2002 | Cremia |
| 6,480,783 B1 | 11/2002 | Myr |
| 6,481,011 B1 | 11/2002 | Lemmons |
| 6,490,722 B1 | 12/2002 | Barton et al. |
| 6,513,014 B1 | 1/2003 | Walker et al. |
| 6,513,069 B1 | 1/2003 | Abato et al. |
| 6,515,964 B1 | 2/2003 | Cheung et al. |
| 6,516,192 B1 | 2/2003 | Spaur et al. |
| 6,519,571 B1 | 2/2003 | Guheen et al. |
| 6,526,455 B1 | 2/2003 | Kamimura |
| 6,526,575 B1 | 2/2003 | McCoy et al. |
| 6,529,526 B1 | 3/2003 | Schneidewend |
| 6,530,082 B1 | 3/2003 | Del Sesto |
| 6,557,042 B1 | 4/2003 | He et al. |
| 6,563,515 B1 | 5/2003 | Reynolds et al. |
| 6,564,381 B1 | 5/2003 | Hodge et al. |
| 6,570,843 B1 | 5/2003 | Wolfgang |
| 6,571,389 B1 | 5/2003 | Spyker et al. |
| 6,574,518 B1 | 6/2003 | Lounsberry et al. |
| 6,577,599 B1 | 6/2003 | Gupta et al. |
| 6,578,199 B1 | 6/2003 | Tsou et al. |
| 6,580,452 B1 | 6/2003 | Gangitano |
| 6,587,985 B1 | 7/2003 | Fukushima et al. |
| 6,594,682 B2 | 7/2003 | Peterson et al. |
| 6,594,699 B1 | 7/2003 | Sahai et al. |
| 6,601,103 B1 | 7/2003 | Goldschmidt Iki et al. |
| 6,601,234 B1 | 7/2003 | Bowman-Amuah |
| 6,601,237 B1 | 7/2003 | Ten Kate et al. |
| 6,611,842 B1 | 8/2003 | Brown |
| 6,614,987 B1 * | 9/2003 | Ismail et al. .................... 386/83 |
| 6,617,980 B2 | 9/2003 | Endo et al. |
| 6,625,716 B2 | 9/2003 | Fackenthal |
| 6,637,029 B1 | 10/2003 | Maissel et al. |
| 6,642,862 B2 | 11/2003 | Boudry |
| 6,642,939 B1 | 11/2003 | Vallone et al. |
| 6,643,322 B1 | 11/2003 | Varma et al. |
| 6,647,411 B2 | 11/2003 | Towell et al. |
| 6,662,330 B1 | 12/2003 | Hershey |
| 6,665,655 B1 | 12/2003 | Warner et al. |
| 6,668,246 B1 | 12/2003 | Yeung et al. |
| 6,668,377 B1 | 12/2003 | Dunn |
| 6,671,323 B1 | 12/2003 | Tahara |
| 6,678,890 B1 | 1/2004 | Cai |
| 6,681,393 B1 | 1/2004 | Bauminger |
| 6,700,893 B1 | 3/2004 | Radha et al. |
| 6,701,528 B1 | 3/2004 | Arsenault et al. |
| 6,704,929 B1 | 3/2004 | Ozer et al. |
| 6,715,004 B1 | 3/2004 | Grimsrud et al. |
| 6,718,551 B1 | 4/2004 | Swix et al. |
| 6,718,552 B1 | 4/2004 | Goode |
| 6,721,713 B1 | 4/2004 | Guheen et al. |
| 6,721,954 B1 | 4/2004 | Nickum |
| 6,728,966 B1 | 4/2004 | Arsenault et al. |
| 6,751,401 B1 | 6/2004 | Arai et al. |
| 6,763,523 B1 | 7/2004 | Sacilotto, Jr. et al. |
| 6,772,209 B1 | 8/2004 | Chernock et al. |
| 6,782,370 B1 | 8/2004 | Stack |
| 6,782,476 B1 | 8/2004 | Ishibashi |
| 6,792,412 B1 | 9/2004 | Sullivan et al. |
| 6,792,470 B2 | 9/2004 | Hakenberg et al. |
| 6,801,936 B1 | 10/2004 | Diwan |
| 6,842,461 B2 | 1/2005 | Harris |
| 6,850,559 B1 | 2/2005 | Driessen et al. |
| 6,865,746 B1 | 3/2005 | Herrington et al. |
| 6,868,551 B1 | 3/2005 | Lawler et al. |
| 6,883,176 B1 | 4/2005 | Grooters |
| 6,898,762 B2 | 5/2005 | Ellis et al. |
| 6,898,800 B2 | 5/2005 | Son et al. |
| 6,922,844 B1 | 7/2005 | Arsenault et al. |
| 6,923,911 B1 | 8/2005 | Beier et al. |
| 6,928,655 B1 | 8/2005 | Omoigui |
| 6,931,657 B1 | 8/2005 | Marsh |
| 6,934,964 B1 | 8/2005 | Schaffer et al. |
| 6,947,935 B1 | 9/2005 | Horvitz et al. |
| 6,950,604 B1 | 9/2005 | Kato et al. |
| 6,973,662 B1 | 12/2005 | Sie et al. |
| 6,990,635 B2 | 1/2006 | Kurapati et al. |
| 6,990,676 B1 | 1/2006 | Proehl et al. |
| 7,007,294 B1 | 2/2006 | Kurapati |
| 7,013,478 B1 | 3/2006 | Hendricks et al. |
| 7,017,189 B1 | 3/2006 | DeMello et al. |
| 7,020,189 B2 | 3/2006 | Sweitzer et al. |
| 7,024,679 B1 | 4/2006 | Sie et al. |
| 7,024,681 B1 | 4/2006 | Fransman et al. |
| 7,028,071 B1 | 4/2006 | Slik |
| 7,028,220 B2 | 4/2006 | Park |
| 7,035,871 B2 | 4/2006 | Hunt et al. |
| 7,036,137 B1 | 4/2006 | Arsenault et al. |
| 7,047,456 B2 | 5/2006 | Jutzi |
| 7,051,352 B1 | 5/2006 | Schaffer |
| 7,055,165 B2 | 5/2006 | Connelly |
| 7,055,168 B1 | 5/2006 | Errico et al. |
| 7,058,027 B1 | 6/2006 | Alessi et al. |
| 7,065,709 B1 | 6/2006 | Ellis et al. |
| 7,072,932 B1 | 7/2006 | Stahl |
| 7,093,295 B1 | 8/2006 | Saito |
| 7,096,486 B1 | 8/2006 | Ukai et al. |
| 7,107,271 B2 | 9/2006 | Aoki et al. |
| 7,114,170 B2 | 9/2006 | Harris et al. |
| 7,117,518 B1 | 10/2006 | Takahashi et al. |
| 7,167,895 B1 | 1/2007 | Connelly |

(56) References Cited

U.S. PATENT DOCUMENTS

| | | |
|---|---|---|
| 7,185,355 B1 | 2/2007 | Ellis et al. |
| 7,231,652 B2 | 6/2007 | Gutta et al. |
| 7,380,262 B2 * | 5/2008 | Wang et al. ............ 725/46 |
| 2001/0003828 A1 | 6/2001 | Peterson et al. |
| 2001/0012299 A1 | 8/2001 | Dahlen |
| 2001/0013127 A1 | 8/2001 | Tomita et al. |
| 2001/0024239 A1 | 9/2001 | Feder |
| 2001/0037507 A1 | 11/2001 | Mori |
| 2001/0047516 A1 | 11/2001 | Swain et al. |
| 2002/0011988 A1 | 1/2002 | Sai et al. |
| 2002/0026496 A1 | 2/2002 | Boyer et al. |
| 2002/0042923 A1 | 4/2002 | Asmussen et al. |
| 2002/0047902 A1 | 4/2002 | Thomas et al. |
| 2002/0056118 A1 | 5/2002 | Hunter et al. |
| 2002/0059394 A1 | 5/2002 | Sanders |
| 2002/0073245 A1 | 6/2002 | Hallford |
| 2002/0087969 A1 | 7/2002 | Brunheroto et al. |
| 2002/0100046 A1 | 7/2002 | Dudkiewicz |
| 2002/0104087 A1 | 8/2002 | Schaffer et al. |
| 2002/0104095 A1 | 8/2002 | Nguyen et al. |
| 2002/0112235 A1 | 8/2002 | Ballou et al. |
| 2002/0124252 A1 | 9/2002 | Schaefer et al. |
| 2002/0129375 A1 | 9/2002 | Kim et al. |
| 2002/0138733 A1 | 9/2002 | Ishibashi et al. |
| 2002/0143591 A1 | 10/2002 | Connelly |
| 2002/0143607 A1 | 10/2002 | Connelly |
| 2002/0144265 A1 | 10/2002 | Connelly |
| 2002/0144269 A1 | 10/2002 | Connelly |
| 2002/0145052 A1 | 10/2002 | Cessac |
| 2002/0152463 A1 | 10/2002 | Dudkiewicz |
| 2002/0152474 A1 | 10/2002 | Dudkiewicz |
| 2002/0156783 A1 | 10/2002 | Schwartz et al. |
| 2002/0156912 A1 | 10/2002 | Hurst et al. |
| 2002/0157103 A1 | 10/2002 | Song et al. |
| 2002/0162120 A1 | 10/2002 | Mitchell |
| 2002/0162121 A1 | 10/2002 | Mitchell |
| 2002/0166269 A1 | 11/2002 | Merkli |
| 2002/0167947 A1 | 11/2002 | Hallford et al. |
| 2002/0174430 A1 | 11/2002 | Ellis et al. |
| 2002/0188944 A1 | 12/2002 | Noble |
| 2002/0193066 A1 | 12/2002 | Connelly |
| 2002/0194585 A1 | 12/2002 | Connelly |
| 2002/0194603 A1 | 12/2002 | Connelly |
| 2002/0199186 A1 | 12/2002 | Ali et al. |
| 2002/0199194 A1 | 12/2002 | Ali |
| 2003/0004955 A1 | 1/2003 | Cedola et al. |
| 2003/0005311 A1 | 1/2003 | Kajimura et al. |
| 2003/0005438 A1 | 1/2003 | Crinon et al. |
| 2003/0005441 A1 | 1/2003 | Inoue |
| 2003/0005451 A1 | 1/2003 | Connelly |
| 2003/0005465 A1 * | 1/2003 | Connelly ............ 725/119 |
| 2003/0016673 A1 | 1/2003 | Pendakur et al. |
| 2003/0046633 A1 | 3/2003 | Jutzi |
| 2003/0046683 A1 | 3/2003 | Jutzi |
| 2003/0050929 A1 | 3/2003 | Bookman et al. |
| 2003/0051240 A1 | 3/2003 | Schaffer et al. |
| 2003/0056216 A1 | 3/2003 | Wugofski et al. |
| 2003/0058933 A1 | 3/2003 | Jutzi |
| 2003/0061206 A1 | 3/2003 | Qian |
| 2003/0061611 A1 | 3/2003 | Pendakur |
| 2003/0065520 A1 | 4/2003 | Jutzi |
| 2003/0066090 A1 | 4/2003 | Traw et al. |
| 2003/0074664 A1 | 4/2003 | Kwoh |
| 2003/0083951 A1 * | 5/2003 | Connelly ............ 705/26 |
| 2003/0093792 A1 | 5/2003 | Labeeb et al. |
| 2003/0097657 A1 | 5/2003 | Zhou et al. |
| 2003/0103532 A1 | 6/2003 | Bertram et al. |
| 2003/0110499 A1 | 6/2003 | Knudson et al. |
| 2003/0135553 A1 | 7/2003 | Pendakur |
| 2003/0135857 A1 | 7/2003 | Pendakur et al. |
| 2003/0149988 A1 | 8/2003 | Ellis et al. |
| 2004/0002896 A1 | 1/2004 | Alanen et al. |
| 2004/0003403 A1 | 1/2004 | Marsh |
| 2004/0117831 A1 | 6/2004 | Ellis et al. |
| 2004/0123323 A1 | 6/2004 | Russo |
| 2004/0163014 A1 | 8/2004 | Correa |
| 2004/0194146 A1 | 9/2004 | Bates et al. |
| 2004/0221307 A1 | 11/2004 | Arai et al. |
| 2004/0226042 A1 | 11/2004 | Ellis |
| 2005/0027382 A1 | 2/2005 | Kirmse et al. |
| 2005/0028208 A1 | 2/2005 | Ellis et al. |
| 2005/0149964 A1 | 7/2005 | Thomas et al. |
| 2005/0155063 A1 | 7/2005 | Bayrakeri et al. |
| 2005/0193414 A1 | 9/2005 | Horvitz et al. |
| 2005/0204387 A1 | 9/2005 | Knudson et al. |
| 2005/0204388 A1 | 9/2005 | Knudson et al. |
| 2005/0262542 A1 | 11/2005 | DeWeese et al. |
| 2005/0273832 A1 | 12/2005 | Zigmond et al. |
| 2005/0283800 A1 | 12/2005 | Ellis et al. |
| 2006/0031882 A1 | 2/2006 | Swix et al. |
| 2006/0190966 A1 | 8/2006 | McKissick et al. |
| 2008/0046930 A1 * | 2/2008 | Smith et al. ............ 725/46 |
| 2010/0017824 A1 * | 1/2010 | Malik ............ 725/46 |

FOREIGN PATENT DOCUMENTS

| | | |
|---|---|---|
| EP | 0905631 | 3/1999 |
| EP | 1028511 | 8/2000 |
| EP | 1043892 | 10/2000 |
| EP | 1089201 | 4/2001 |
| EP | 1089571 | 4/2001 |
| EP | 1089572 | 4/2001 |
| JP | 2001101190 | 4/2001 |
| JP | 20011011190 | 4/2001 |
| JP | 2001290727 | 10/2001 |
| JP | 2003032710 | 1/2003 |
| WO | WO91/02311 | 2/1991 |
| WO | WO9102311 | 2/1991 |
| WO | WO9726729 | 7/1997 |
| WO | WO9944159 | 9/1999 |
| WO | WO9965237 | 12/1999 |
| WO | WO0001149 | 1/2000 |
| WO | WO0027124 | 5/2000 |
| WO | WO0040028 | 7/2000 |
| WO | WO0059204 | 10/2000 |
| WO | WO0064165 | 10/2000 |
| WO | WO0064168 | 10/2000 |
| WO | WO0105449 | 3/2001 |
| WO | WO0115451 | 3/2001 |
| WO | WO0117195 | 3/2001 |
| WO | WO0137123 | 5/2001 |
| WO | WO172042 | 9/2001 |
| WO | WO0193524 | 12/2001 |
| WO | WO0248863 | 6/2002 |
| WO | WO02103940 | 12/2002 |
| WO | WO02103941 | 12/2002 |
| WO | WO02104030 | 12/2002 |
| WO | WO02104031 | 12/2002 |
| WO | WO03028381 | 4/2003 |
| WO | WO03030540 | 4/2003 |
| WO | WO03061245 | 7/2003 |

OTHER PUBLICATIONS

Final Office Action for U.S. Appl. No. 09/966,676 mailed Mar. 2, 2007, 13 pages.
U.S. Appl. No. 09/532,034, Connelly, Jay H.
U.S. Appl. No. 09/533,034, Connelly, Jay H.
U.S. Appl. No. 09/717,579, Jutzi, Curtis E.
"U.S. Appl. No. 09/823,566", U.S. Office Action, U.S. Appl. No. 09/823,566, (Oct. 23, 2006), 1-8.
"U.S. Appl. No. 09/895,433", U.S. Office Action, (Jun. 1, 2007), 8 pages.
"U.S. Appl. No. 10/044,544", U.S. Office action, U.S. Appl. No. 10/044,544, (Oct. 18, 2006), 27 pp.
"U.S. Appl. No. 10/044,546", U.S. Office Action, U.S. Appl. No. 10/044,546, (Nov. 15, 2006), 1-23.
"Internet and Broadcast; the Key to Digital Convergence", *Intel DeveloperUPDATEMagazine*, (May 2000), pp. 1-3.
"Office Action for U.S. Appl. No. 09/882,091, mailed Nov. 26, 2007 (34 pp)".
"Office Action for U.S. Appl. No. 09/882,205, mailed Aug. 29, 2007 (21 pp)".

(56) References Cited

OTHER PUBLICATIONS

"Office Action for U.S. Appl. No. 09/882,205, mailed Dec. 13, 2007 (18 pp)".
"Office Action for U.S. Appl. No. 09/966,676, mailed Feb. 21, 2008 (17 pp)".
"Office Action for U.S. Appl. No. 09/966,676, mailed Sep. 10, 2007 (34 pp)".
"Office Action for U.S. Appl. No. 10/043,918, mailed Oct. 2, 2007 (23 pp)".
"PCT International Search Report", PCT/US01/43862 (Dec. 4, 2003), 1-4.
"PCT International Search Report", PCT/US02/17270, (Jun. 3, 2003), 1-4.
"PCT International Search Report", PCT/US02/17381 (Oct. 20, 2003), 1-6.
"PCT International Search Report", PCT/US02/17316 (Nov. 6, 2002), 1-8.
"PCT International Search Report", PCT/US02/29091, (Apr. 3, 2003), 1-5.
"PCT International Search Report", PCT/US02/29099 (Mar. 28, 2003), 1-4.
"PCT International Search Report", PCT/US03/001694 (Jun. 2, 2003), 1-4.
Advanced Television Systems Comm, "Program and System Information Protocol for Terrestrial Broadcast and Cable (Revision A) and Amendment No. 1", *Advanced Television Systems Committee Doc. A/65A*, Dec. 23, 1997, Rev. A pp. a-e and pp. 1-135, (May 31, 2000), pp. a-e & 1-135.
Anonymous, "Set-top box offer new possibilities for broadcaster", *Proquest, Broadcast Engineering, Overland Park.* vol. 41, Issue 7., (Jun. 1999), pp. 1-2.
Blundon, William , "When Push comes to Shove", *Blundons Corner*, (Apr. 1997), pp. 1-4.
Business Wire, "MessageMedia Launches Support View", (Nov. 18, 1999), 1-2.
Cisco.Com, "Internet Protocol (IP) Mutlicast Technology Overview", http://.www.cisco.com/warp/_public/cc/pd/iosw/tech/ipmu_ov/htm, Whitepaper Cisco.Systems, Inc. Posted Jun. 27, 2001. Retrieved on Jun. 29, 2001., pp. 1-16.
Datta, Anindya , et al., "Adaptive Broadcast Protocols to Support Power Conservant Retrieval by Mobile Users", *IEEE Explore*, (Apr. 7, 1997), pp. 1-12.
European Broadcasting Union, "Digital Video Broadcasting(DVB); Specifications for Service Information (SI) in DDVB systems", *European Broadcasting Union ETSI EN 300 468 V1.4.1*(Nov. 2000), France Copyright 2000., pp. 1-83.
Foremski, Tom , "New digital technology is putting more choice in the hands of traditional TV audiences whi will increasingly be able to decide their own programme schedules", *Financial Times*, (Mar. 3, 1999), pp. 1-5.
Fry, Andy , "Channelling digital choice", *Marketing*, London, (Sep. 24, 1998), pp. 1-5.
Gummalla, Ajay Chandra V., "An Access Protocol for a Wireless Home Network", *IEEE*, Wireless Communications and Networking Conference, Sep. 21, 1999, 1392-1396.
Hartwig, Stephan , et al., "Broadcasting and Processing of Program Guides for Digital TV", *SMPTE Journal, SMPTE, Inc.*, vol. 106, No. 10, Scarsdale, NY, XP000668926, (Oct. 1997), 727-732.
Haskell, Barry G., et al., "Digital Video; An Introduction to MPEG-2", Chapman and Hall, New York NY, (1997), pp. 280-283.
Haubner, Dr. P. , et al., "Netzdienste fur Multimediale Anwendungen CSCW—MBone", *Teleseminar: Multimedia Systeme—Technoloqie and Gestaltunq WS 95/96*, XP002248684, (1996), 1-20.
Holfeder, Wieland , "Interactive Remote Recording and Playback of Multicast Videoconferences", XP002088645, (Sep. 10, 1997), 450-463.
Holsendolph, Ernest , "The TV that works Like a Genie in a Box a Coputer called TIVO acts Like a Brainy VCR. Even Fetching programs that it thinks you might like to watch", *Cox News Service, Greensboro News Record*, Greensboro, NC, (Sep. 3, 1999), pp. 1-4.

Hu, Qinglong , et al., "Power Conservative Multi-Attribute Queries on Data Broadcast", *IEEE*, Data Engineering, 16th International Confererence, San Diego, Calif., (2000), 157-177.
Hwang, Ren-Hung , et al., "Scheduling Policies for an VOD System over CATV Networks", *IEEE*, Department of Computer Science & Information Engineering, (1997), 438-442.
Int'L Org. For Standardization, "Information Technology—Generic Coding of Moving Pictures and Associated Audio: Systems, Recommendation H.222.0, ISO/IEC 13818-1", *Int'l Orq. for Standardization, Coding of Moving Pictures and Associated Audio*, N0801, XP002033056, (Nov. 13, 1994), 161 pp.
Intel Corporation, "Client Infrastructure for Internet-Based Data Services for Digital Television; Enabling a New Class of DTV Services", *INTEL: Intel Architecture*, (2000), pp. 1-10.
Intel Corporation, "Internet and Broadcast: The Key to Digital Convergence. Utilizing Digital Technology to Meet Audience Demand", *INTEL: Intel Architecture Labs*, (2000), pp. 1-4.
INTEL.com, "Enhanced Digital Broadcast", http://www.develooer.intel.com/ial/home/digentertain/edb.htm., Retrieved on the Internet on Aug. 21, 2001. IAL Digitial Entertainment, pp. 1-3.
Morgenstern, Steve , "Digital Etc. the end of TV as we know it", *Proquest, Rolling Stone.* New York, Issue 818, (Aug. 5, 1999), pp. 1-2.
Replaytv.com, "Competitive Differences ReplayTV Rules Here's Why . . . ", www.replaytv.com/overview/differences.htm, (Mar. 21, 2000), pp. 1-2.
Replaytv.com, "Features Your Time, Your Schedule", www.replavtv.com.overview/features/htm., Retrieved on Mar. 21, 2000., pp. 1-2.
Replaytv.com, "Frequently Asked Questions. Will ReplayTV make me more popular? and other frequently asked questions.", www.replaytv.com/overview/faqs.htm, retrieved on Mar. 21, 2001, pp. 1-4.
Replaytv.com, "ReplayTV: Features/Benefits", www.replaytv.com/overview/details.htm, Retrieved on Mar. 21, 2000., pp. 1-3.
Replaytv.com, "Technical Specifications", www.replaytv.com/overview/techspecs.htm., Retrieved on Mar. 21, 2000., p. 1.
Replaytv.com, "What is ReplayTV? Introducing the new ReplayTV 2020", www.replaytv.com/overview/index.htm., Retrieved on Mar. 21, 2000., pp. 1.
Rosenberg, Jerry , "Dictionary of Computers, information processing & telecommunications", *2nd edition*, (1987), p. 65.
Smyth, B , et al., "A Personalized Television Listings Service", *Communications of the ACM*, vol. 43, No. 8, (Aug. 2000), pp. 107-111.
Tivo.com, "Channel SURF in a whole new way", http://www.tivo.com/what/intro4/html, [retrieved on Mar. 21, 2000], pp. 1.
Tivo.com, "Control Live TV", http://www.tivo.com/what/intro2/html, [retrieved on Mar. 21, 2000], p. 1.
Tivo.com, "Digital Recordings without the Tape", http://www.tivo.com/what/intro5/html, [retrieved on Mar. 21, 2000], p. 1.
Tivo.com, "Frequently Asked Questions", http://www.tivo.com/what/faq_sub.html., Retrieved on Mar. 21, 2000., pp. 1-9.
Tivo.com, "Product Specifications", http://www.tivo.com/what/how2html, [retrieved on Mar. 21, 2000], p. 1.
Tivo.com, "Something Good Is Always on", http://www.tivo.com/what/intro3/html., Retrieved on Mar. 21, 2000., p. 1.
Tivo.com, "What is TiVo? Introduction to TiVo. Something Good is Always on", http://www.tivo.com/what/intro3.html, (Mar. 21, 2000), 1.
Tivo.Com, "What is TiVo? Introduction to TiVo. A Better to Watch TV", http://www.tivo.com/what/intro/html, Retrieved on Mar. 21, 2000., p. 1.
Tivo.Com, "What you want, When you want it", http://www.tivo.com/what/how/html., Retrieved on Mar. 21, 2000., p. 1.
Wittig, Hartmut , et al., "Intelligent Media Agents in Interactive Television Systems", *IEEE*, Proceedings of the Int'l Conf. on Multimedia Computing and Systems, Los Angeles, CA XP00603484, (May 15, 1995), 182-189.
Wolinsky, Howard , "Hard Drive toward personalized TV // New computer devices search logs, then record", Proquest, *Chicago Sun—Times*, Chicago, Ill., (Jan. 19, 1999), pp. 1-3
Wong, Tina , "Multicast Push Service for Web Content", *CS294-6 Internet Service Project Report*, (Aug. 26, 2004), pp. 1-4

\* cited by examiner

501

| NAME | ACTOR | GENRE |
|---|---|---|
| ACTION DUDE | JOE SMITH | ACTION |
| THE FUNNY SHOW | JANE DOE | COMEDY |
| BLAST 'EM | JANE DOE | ACTION |
| HARDY HAR HAR | JOE SMITH | COMEDY |

| ATTRIBUTE | ATTRIBUTE VALUE | RELEVANCE | BELIEVABILITY |
|---|---|---|---|
| ACTOR | JOE SMITH | 0 | 0 |
| ACTOR | JANE DOE | 0 | 0 |
| GENRE | ACTION | 0 | 0 |
| GENRE | COMEDY | 0 | 0 |

| NAME | RATING | RATING TYPE | IN CACHE | NEXT TREATMENT |
|---|---|---|---|---|
| ACTION DUDE | 0 | N/A | YES | N/A |
| THE FUNNY SHOW | 0 | N/A | YES | N/A |
| BLAST 'EM | 0 | N/A | YES | N/A |
| HARDY HAR HAR | 0 | N/A | NO | N/A |

FIG. 7

| NAME | CLASSIFICATION |
|---|---|
| ACTION DUDE | RECEIVE |
| THE FUNNY SHOW | REFUSE |
| BLAST 'EM | N/A |
| HARDY HAR HAR | N/A |

| ATTRIBUTE | ATTRIBUTE VALUE | RELEVANCE | BELIEVABILITY |
|---|---|---|---|
| ACTOR | JOE SMITH | 1 | 0 |
| ACTOR | JANE DOE | -1 | 0 |
| GENRE | ACTION | 1 | 0 |
| GENRE | COMEDY | -1 | 0 |

| ATTRIBUTE | ATTRIBUTE VALUE | RELEVANCE | BELIEVABILITY |
|---|---|---|---|
| ACTOR | JOE SMITH | 1 | 1 |
| ACTOR | JANE DOE | -1 | 0 |
| GENRE | ACTION | 1 | 1 |
| GENRE | COMEDY | -1 | 0 |

| NAME | RATING | RATING TYPE | IN CACHE | NEXT TREATMENT |
|---|---|---|---|---|
| ACTION DUDE | 1 | EXPLICIT | YES | REPLACE |
| THE FUNNY SHOW | 0 | EXPLICIT | YES | REPLACE |
| BLAST 'EM | 0.5 | IMPLICIT | YES | KEEP |
| HARDY HAR HAR | 0.5 | IMPLICIT | NO | CAPTURE |

| ATTRIBUTE | ATTRIBUTE VALUE | RELEVANCE | BELIEVABILITY |
|---|---|---|---|
| ACTOR | JOE SMITH | 1 | 1 |
| ACTOR | JANE DOE | -1 | -1 |
| GENRE | ACTION | 2 | 2 |
| GENRE | COMEDY | -1 | 0 |

METHOD AND APPARATUS TO PROVIDE A PERSONALIZED CHANNEL

CROSS REFERENCES TO RELATED APPLICATIONS

This application is a continuation-in-part of application Ser. No. 09/966,676 filed on Sep. 28, 2001 now abandoned.

FIELD OF THE INVENTION

The present invention relates generally to broadcast systems and, more specifically, the present invention relates to providing a personalized channel.

BACKGROUND INFORMATION

Broadcast systems traditionally transmit data in one direction from a server system to a plurality of client systems. For example, television and movies today are delivered via network and content aggregators. Moreover, content is delivered in a manner that has the broadest appeal. As an illustration, many of today's television broadcasters rely upon Neilson ratings to determine broadcast programming and/or scheduling. Neilson ratings are generally based upon only a small sampling of a cross-section of the public. Consequently, most television viewers have relatively little or no impact on broadcast schedules and/or content. Users of client systems typically just consume the signals received from the server system as they are broadcast.

One paradigm in which users are provided with some input into the content delivered to them is "content on demand," which involves server systems that broadcast the same data continuously and/or at staggered intervals. Thus, if a user desires to consume a particular data file on demand, the user "tunes in" to one of the repeated broadcasts of the data file. One example of this paradigm can be illustrated with present day "pay per view" movies that are available from cable or satellite television providers. For instance, cable television providers commonly broadcast the same movies repeatedly on multiple channels at staggered intervals. Users that wish to watch a particular movie "on demand" simply tune in to one of the channels on which the desired movie is broadcast at the beginning of one of the times that the movie is broadcast. The continuous and repeated broadcasts of the same data or programs results in a very inefficient use of broadcast bandwidth. Bandwidth used to broadcast the same data repeatedly on multiple channels could otherwise be used to broadcast different data.

Another paradigm for providing content on demand in a broadcast system involves a user recording a particular data file and later accessing the data file "on demand." Continuing with the television broadcast illustration discussed above, an example of this paradigm is a user setting up his or her video cassette recorder (VCR) to record a desired television program. Later, when the user wishes to watch the television program "on demand," the user simply plays the earlier recorded program from his or her VCR. Recently, more advanced digital video recorders have become available, which record the television broadcasts on internal hard drives instead of the video cassette tapes used by traditional VCRs. However, use of the digital video recorders is similar to traditional VCRs in that the users are required to explicitly set the criteria used (e.g. date, time) to determine which broadcasts are recorded on the internal hard drives.

Other paradigms have been established to deliver content targeted at specific interest groups such as core interest channels, e.g. the Cartoon Network, the Disney Network, the E! Entertainment Network, etc.

However, even with the use of these new paradigms to provide targeted content and content "on demand," none of these paradigms take into account a user's past viewing history and automatically and specifically target content for a given user.

BRIEF DESCRIPTION OF THE DRAWINGS

The present invention is illustrated by way of example and not limitation in the accompanying figures.

FIG. 5 is an illustration of one example of meta-data broadcast by a server to describe a data file in accordance with the teachings of the present invention.

FIG. 6 is an illustration of one example of a meta-data table updated and maintained by a client in accordance with the teachings of the present invention.

FIG. 7 is an illustration of one example of a content rating table updated and maintained by a client in accordance with the teachings of the present invention.

FIG. 8 is a diagram an illustrating one embodiment of data files that are classified by a user in accordance with the teachings of the present invention.

FIG. 9 is a diagram illustrating one embodiment of a meta-data table that is updated in response to user classifications in accordance with the teachings of the present invention.

FIG. 10 is a diagram illustrating one embodiment of a meta-data table that is updated after a user access in accordance with the teachings of the present invention.

FIG. 11 is a diagram illustrating one embodiment of a content rating table that is updated after a user access in accordance with the teachings of the present invention.

FIG. 12 is a diagram illustrating another embodiment of a meta-data table that is updated after another user access in accordance with the teachings of the present invention.

DETAILED DESCRIPTION

In one aspect of the present invention, signaling methods and apparatuses for providing content on demand in a broadcast system are disclosed. In another aspect of the present invention, methods and apparatuses are disclosed for rating content to be broadcast or to be broadcast potentially from a server are disclosed. In yet another aspect of the present invention, methods and apparatuses for dynamically determining the broadcast content and/or schedule of a server are disclosed.

In one particular embodiment of the present invention, a method, apparatus, and machine-readable medium for automatically delivering data files (e.g. television and movies) via a personalized channel to a user, that are based on the user's profile and viewing habits, are provided. The personalized channel is displayed on a display device to the user. This enables a passive viewing experience for the end-user. The user only needs to tune to his or her personalized channel (e.g. channel 99) to view personalized content synthesized from all of available content sources available to the user. As an illustration, the content can be reviewed from a multitude of sources such as cable, standard television (TV) signals (e.g. National Television Standards Committee NTSC), Advanced Television System Committee (ATSC) format, Digital Video Broadcast (DVB) format, over a computer network, etc.)

In the following description, the various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, types of data, protocols, procedures, components, networking equipment, electrical structures and circuits, are not described in detail, or are shown in block diagram form, in order not to obscure the present invention. Furthermore, aspects of the invention will be described in particular embodiments but may be implemented in hardware, software, firmware, middleware, or a combination thereof.

Figure 1A:
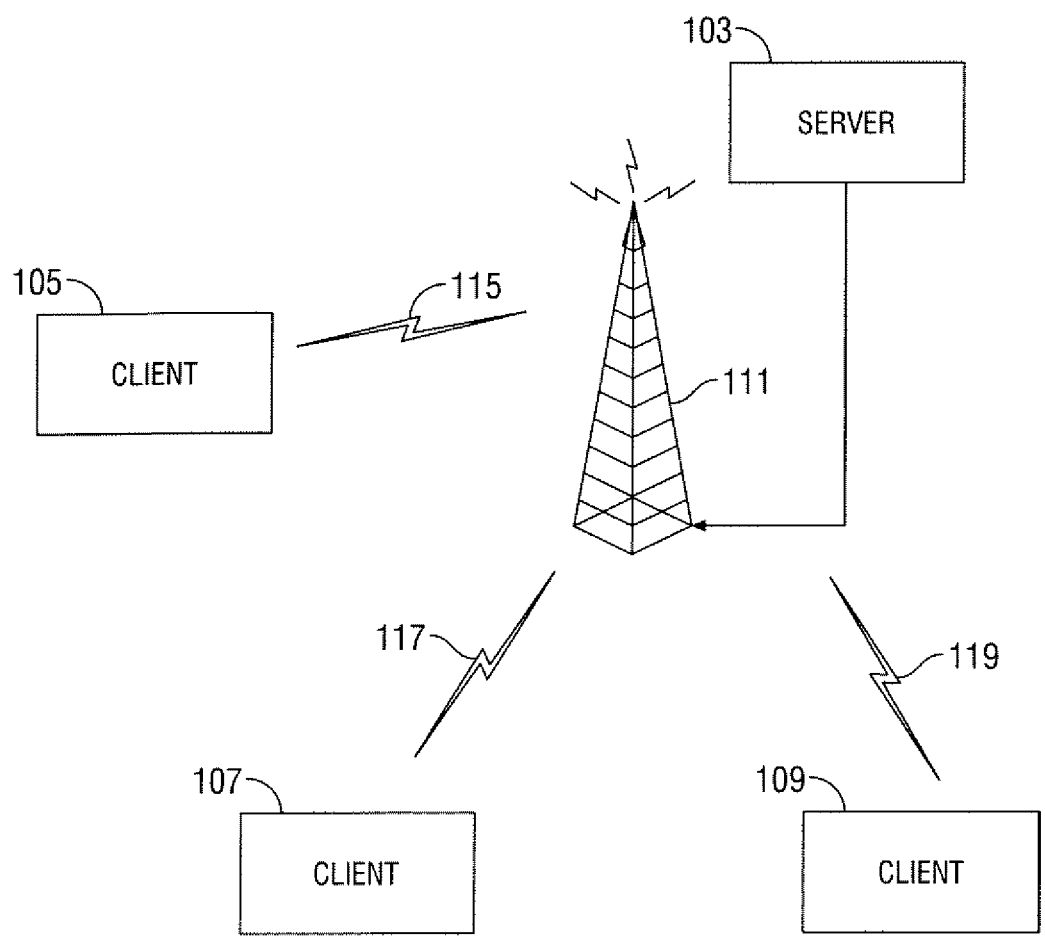
FIG. 1A is a block diagram illustrating one embodiment of a broadcast system in accordance with the teachings of the present invention.

FIG. 1A is an illustration of one embodiment of a broadcast system in accordance with the teachings of the present invention. As illustrated in the depicted embodiment, a server 103 is configured to broadcast information to a plurality of clients 105, 107 and 109. In the embodiment shown in FIG. 1A, client 105 receives a broadcast from server 103 through a link 115 from a broadcast antenna 111. Similarly, client 107 receives a broadcast from server 103 through a link 117 and client 109 receives a broadcast from server 103 through a link 119 from broadcast antenna 111. In one embodiment, links 115, 117 and 119 are uni-directional wireless radio frequency (RF) links from broadcast antenna in a format such as for example, but not limited to known amplitude modulation (AM) or frequency modulation (FM) radio signals, standard television (TV) signals (e.g. National Television Standards Committee (NTSC)), Advanced Television System Committee (ATSC) format, digital video broadcast (DVB) signals or the like, which are broadcast through the atmosphere.

In one embodiment, server 103 is configured to broadcast a plurality of data files, which may be received by clients 105, 107 and 109. In one embodiment, the data files may be any combination of a number of different types of files including for example video, audio, graphics, text, multi-media or the like. For purposes of explanation, many of the examples provided in this disclosure to help describe the present invention assume that the data files to be broadcast by the server are audio/video files, such as for example movies with moving images and sound. However, it will be appreciated that the data files broadcast in accordance with the teachings of the present invention are not limited only to audio/video files.

Figure 1B:
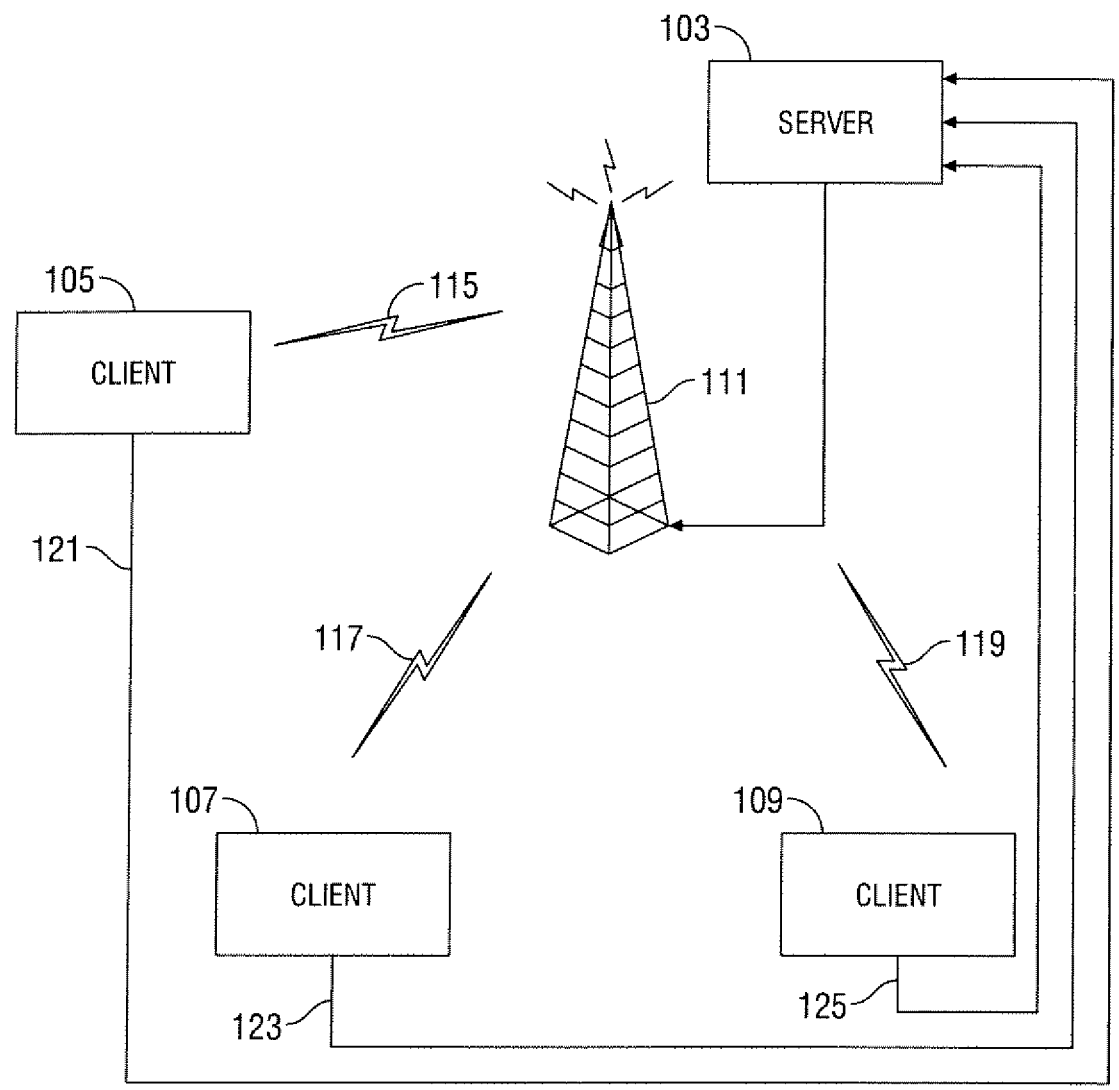
FIG. 1B is a block diagram illustrating another embodiment of a broadcast system in accordance with the teachings of the present invention.

As illustrated in the embodiment shown FIG. 1A, there is a one-way or uni-directional link between the server 103 and clients 105, 107 and 109. However, in another embodiment, it is appreciated that there may also be a communications link between server 103 and each client 105, 107 and 109, respectively. In particular, FIG. 1B is an illustration of the broadcast system of FIG. 1A with the addition of a "back channel" or communications link between each client 105, 107 and 109 and server 103. In particular, the embodiment illustrated in FIG. 1B shows links 121, 123 and 125, which may be used by clients 105, 107 and 109, respectively, to send information back to server 103. In one embodiment, however, links 121, 123 and 125 are not utilized in accordance with the teachings of the present invention. As will be discussed, in another embodiment, links 121, 123 and 125 are utilized in accordance with the teachings of the present invention. Although links 121, 123 and 125 are illustrated in FIG. 1B as direct links between clients 105, 107 and 109 and server 103, it is appreciated that clients 105, 107 and 109 may communicate information to server 103 through indirect links such as for example but not limited to broadcasted wireless signals, network communications or the like.

Figure 1C:
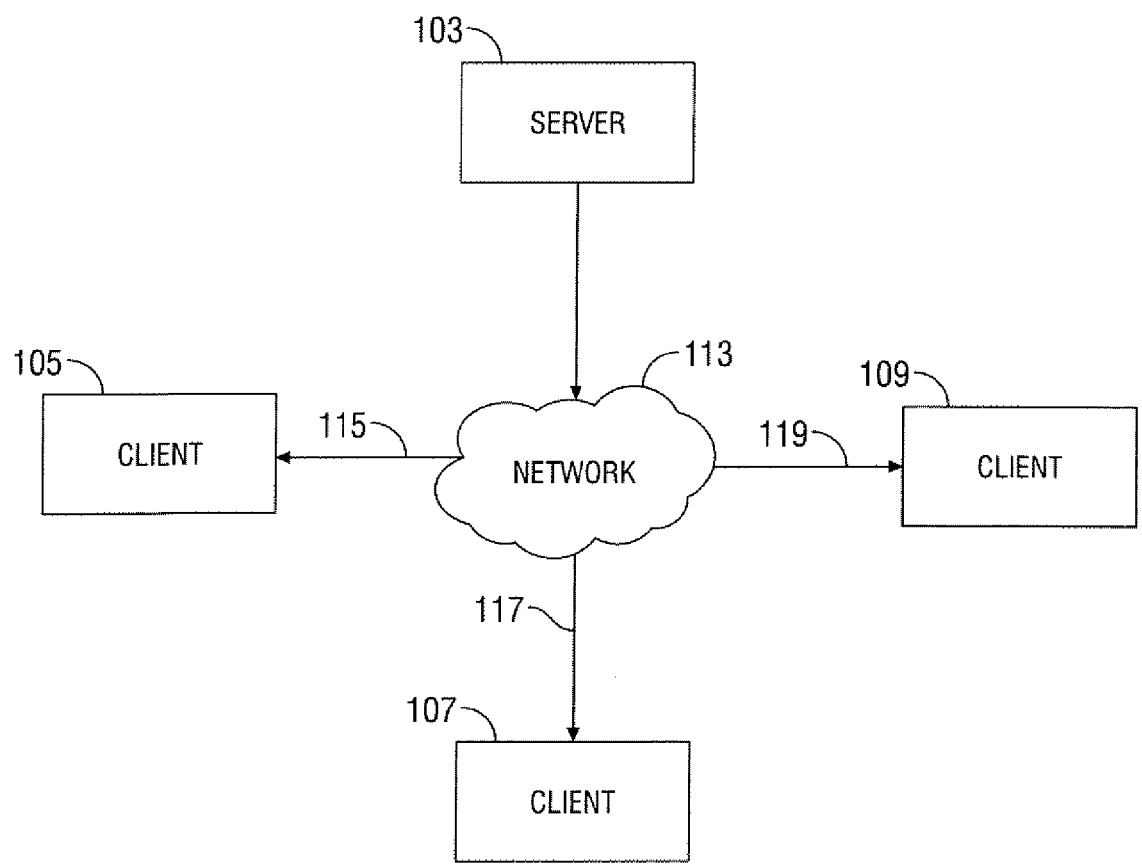
FIG. 1C is a block diagram illustrating yet another embodiment of a broadcast system in accordance with the teachings of the present invention.

FIG. 1C is an illustration of yet another embodiment of a broadcast system in accordance with the teachings of the present invention. As shown, server 103 is coupled to broadcast information to a plurality of clients 105, 107 and 109 through a network 113. In one embodiment, network 113 may be any type of communications network through which a plurality of different devices may communicate such as for example but not limited to the Internet, a wide area network (WAN), a local area network (LAN), an intranet, or the like.

In the embodiment illustrated in FIG. 1C, client 105 is coupled to receive information broadcast from server 103 through link 115. Similarly, client 107 is coupled to receive information broadcast from server 103 through link 117 and client 109 coupled to receive information broadcast from server 103 through link 119. It is noted that in the embodiment illustrated in FIG. 1C, links 115, 117 and 119 are shown as uni-directional links from network 113 to clients 105, 107 and 109. In another embodiment, links 115, 117 and 119 are bi-directional links, which enable clients 105, 107 and 109 to communication information to server 103. For example, links 115, 117 and 119 could be cable links.

Figure 2:
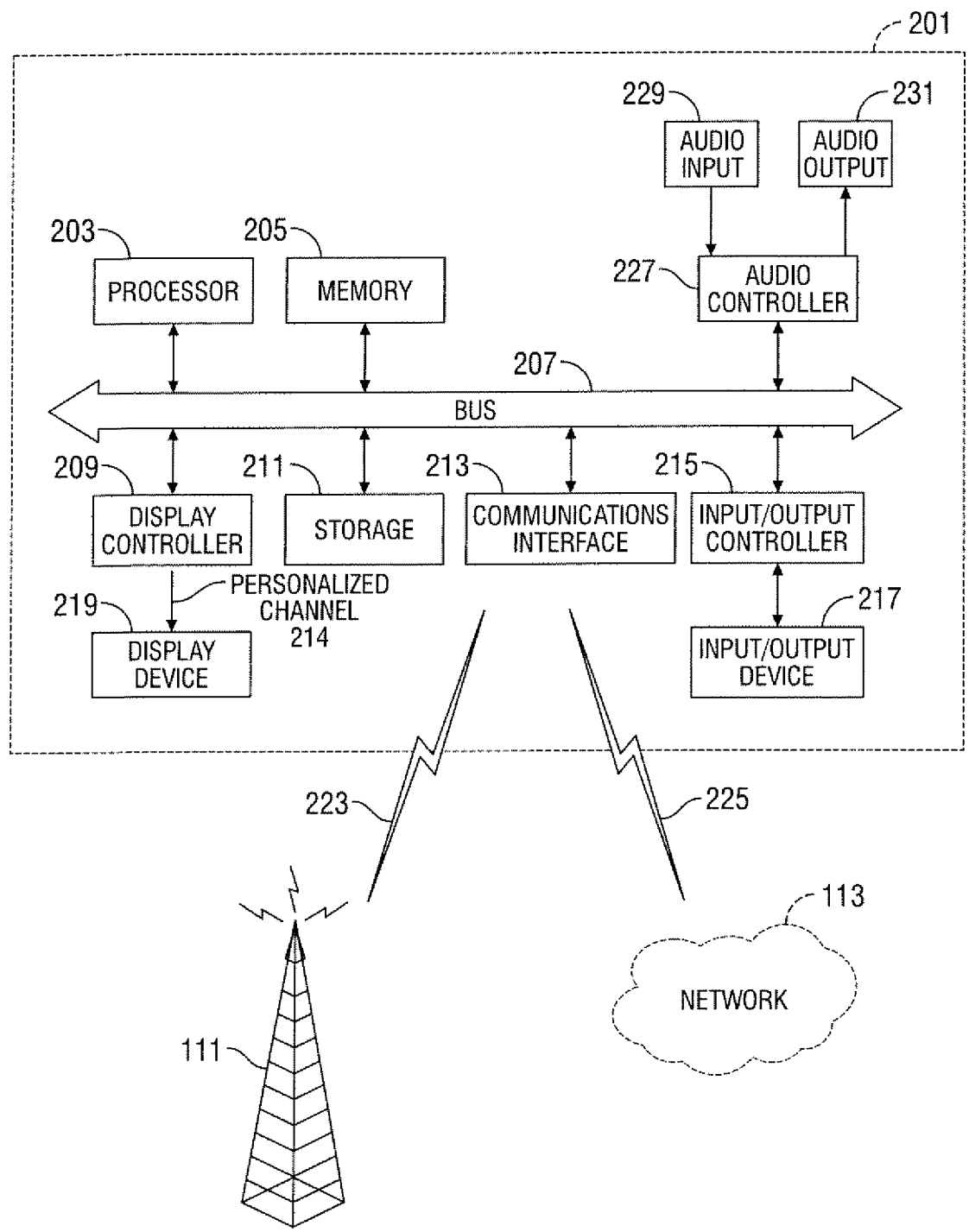
FIG. 2 is a block diagram of one embodiment of a computer system representative of a client or a server in accordance with the teachings of the present invention.

FIG. 2 is a block diagram illustrating one embodiment of a machine 201 that may be used for the server 103, or clients 103, 105 or 107 in accordance with the teachings of the present invention. In one embodiment, machine 201 is a computer or a set top box that includes a processor 203 coupled to a bus 207. In one embodiment, memory 205, storage 211, display controller 209, communications interface 213, input/output controller 215 and audio controller 227 are also coupled to bus 207.

In one embodiment, machine 201 interfaces to external systems through communications interface 213. Communications interface 213 may include a radio transceiver compatible with FM, TV, digital TV, DVB, wireless telephone signals or the like. Communications interface 213 may also include an analog modem, Integrated Services Digital Network (ISDN) modem, cable modem, Digital Subscriber Line (DSL) modem, a T-1 line interface, a T-3 line interface, an optical carrier interface (e.g. OC-3), token ring interface, satellite transmission interface, a wireless interface or other interfaces for coupling a device to other devices.

In one embodiment, a carrier wave signal 223 is received by communications interface 213 to communicate with antenna 111. In one embodiment, carrier wave signal 225 is received/transmitted between communications interface 213 and network 113. In one embodiment, a communications signal 225 may be used to interface machine 201 with another computer system, a network hub, router or the like. In one embodiment, carrier wave signals 223 and 225 are considered to be machine readable media, which may be transmitted through wires, cables, optical fibers or through the atmosphere, or the like.

In one embodiment, processor 203 may be a conventional microprocessor, such as for example but not limited to an Intel x86 or Pentium family microprocessor, a Motorola family microprocessor, or the like. Memory 205 may be a machine readable medium such as dynamic random access memory (DRAM) and may include static random access memory (SRAM). Display controller 209 controls in a conventional manner a display device 219, which in one embodiment may be a cathode ray tube (CRT), a liquid crystal display (LCD), an active matrix display, a television monitor or the like. The input/output device 217 coupled to input/output controller 215 may be a keyboard, disk drive, printer, scanner and other input and output devices, including a television remote, mouse, trackball, trackpad, joystick, or the like. In one embodiment, audio controller 227 controls in a conventional manner audio output 231, which may include for example audio speakers, headphones, an audio receiver, amplifier or the like. In one embodiment, controller also controls in a conventional manner audio input 229, which may include for example a microphone or input(s) from an audio or musical device, or the like.

Storage 211 in one embodiment may include machine readable media such as for example but not limited to a magnetic hard disk, a floppy disk, an optical disk, a smart card or another form of storage for data. In one embodiment, storage 211 may include removable media, read-only media, readable/writable media or the like. Some of the data may be written by a direct memory access process into memory 205 during execution of software in computer system 201. It is appreciated that software may reside in storage 211, memory 205 or may be transmitted or received via modem or communications interface 213. For the purposes of the specification, the term "machine readable medium" shall be taken to include any medium that is capable of storing data, information or encoding a sequence of instructions for execution by processor 203 to cause processor 203 to perform the methodologies of the present invention. The term "machine readable medium" shall be taken to include, but is not limited to solid-state memories, optical and magnetic disks, carrier wave signals, and the like.

In one embodiment, a broadcast system, such as for example one similar to any of those illustrated in FIGS. 1A-1C, is configured to have a server 103 broadcast a plurality of data files to a plurality of clients 105, 107 and 109. As will be discussed in greater detail below, each of the plurality of data files is described with meta-data in accordance with teachings of one embodiment of the present invention. In general, meta-data can be considered as a set of descriptors or attribute values that describe content or data files to be broadcast or potentially broadcast from server 103. The meta-data of the present invention provides information that enables client systems 105, 107 and 109 to reason and make informed decisions regarding the content of data files to be broadcast later by server 103. As will be discussed, various embodiments of the present invention utilize the meta-data for client-side filtering, storage management and other personalization techniques as well as determine broadcast schedules and content of future server broadcasts. For example, embodiments of the present invention provide for automatically delivering data files (e.g. television and movies) on a personalized channel 214 for display on the display device 219 to the user, that are based on a user's profile and viewing habits.

Figure 3:
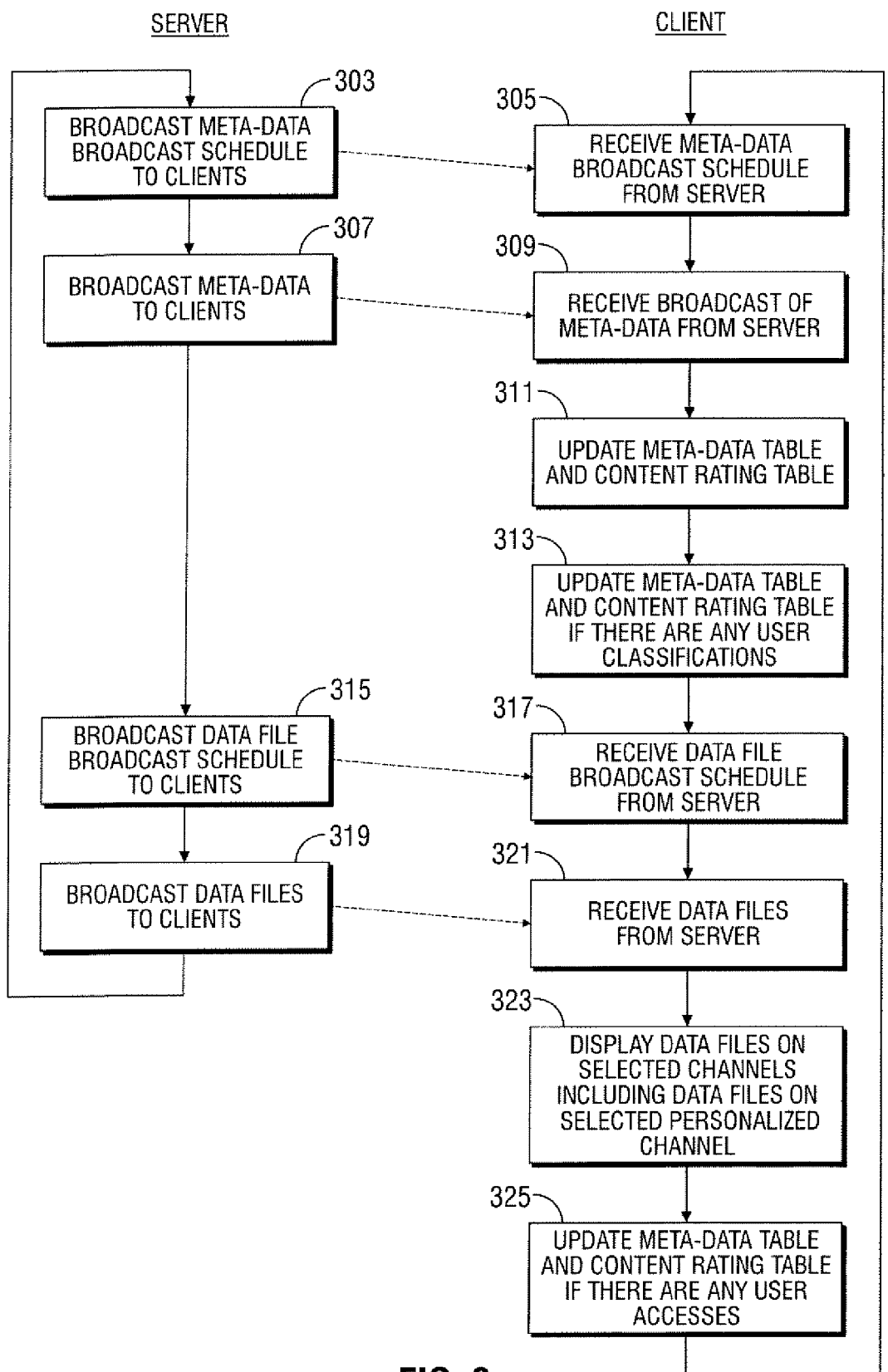
FIG. 3 is a flow diagram illustrating one embodiment of the flow of events in a server and a client when broadcasting meta-data and data files in accordance with the teachings of the present invention.

FIG. 3 is a flow diagram illustrating the processing that is performed in accordance with teachings of one embodiment of the present invention. FIG. 3 illustrates one embodiment of a signaling protocol in which signals are transmitted such that client systems can locate and acquire broadcast content. This includes a pre-broadcast of meta-data by server 103 to client systems 105, 107 and 109. In particular, process block 303 of FIG. 3 shows that the server broadcasts the meta-data broadcast schedules to the clients. In one embodiment, the meta-data broadcast schedule indicates some point in the future when the actual meta-data of the present invention is going to be broadcast by the server. In one embodiment, the client systems use known ports such as for example those used in the program and system information protocol (PSIP), DVB, service advertising protocol (SAP) or the like to listen for upcoming service announcements from the server.

In one embodiment, each client 105, 107 and 109 contains a known scheduling service, which accepts requests to wake up, or be activated, at a specific time to receive the information broadcast by the server. This scheduling service enables the client to wake up at a specified time and select a specified service. For example, in one embodiment, this selection process can be accomplished by tuning to a specific frequency, such as for example in an Advanced Television Systems Committee (ATSC) or a DVB transponder or the like. In one embodiment, the selection process or can be based on a set of data, such as for example multi-cast Internet protocol (IP) addresses, which define a service.

In one embodiment, a client application registers with the client signaling system to receive signals from a specific content provider. The client signaling system maintains a table of applications associated with specific content providers. In one embodiment, information from the server is broadcast over known addresses such that each client can use the known address.

Process block 305 shows that the client receives the meta-data broadcast schedule from the server. In one embodiment, client systems 105, 107 and 109 capture and process this pre-broadcast information in order to determine when to wake-up and receive content, where to receive the content and which content to receive. In one embodiment, when the meta-data broadcast schedule is received by the client, the registered application in the client is notified to receive the meta-data broadcast schedule.

In one embodiment, the clients wake-up at the pre-specified time indicated in the meta-data broadcast schedule to receive the meta-data from the server. Process block 307 shows that the meta-data is then actually broadcast from the server to the clients at the time specified in the meta-data broadcast schedule. Process block 309 shows that the client receives the broadcast of meta-data from the server. As will be discussed, the meta-data includes descriptions of a plurality of data files that will be broadcast or potentially broadcast later by the server system.

Process block 311 shows that the client system then updates a meta-data table and a content rating table. In one embodiment, a meta-data table and a content rating table are updated and maintained internally or locally by each client system in accordance with the teachings of the present invention.

In one embodiment, a user of the client system may optionally classify any one or more of the plurality of data files that are described by the received meta-data. As will be discussed, the meta-data table and content rating table are updated by the client if there is a user classification. This is shown in FIG. 3 with process block 313.

In one embodiment, the clients wake-up to receive a data file broadcast schedule from the server. In one embodiment, the data file broadcast schedule indicates a future time in which specific data files, which were described in the previously broadcast meta-data, will be broadcast by the server. Process block 315 shows that the data files are then actually broadcast from the server to the clients at the time specified in the data file broadcast schedule. Process block 317 shows that the client receives the broadcast of data file broadcast schedule from the server.

In one embodiment, the clients wake-up at the pre-specified time indicated in the data file broadcast schedule to receive the data files from the server. Process block 319 shows that the data files are then actually broadcast from the server to the clients at the time specified in the data file broadcast schedule.

In one embodiment, process block 321 shows that the client receives the broadcast of the data files from the server. In one embodiment, client-side filtering according to the present invention is provided the client selectively storing data files according to the content rating table. In another embodiment, client-side filtering is provided by the client selectively waking up to selectively receive data files broadcast from the server according to the content rating table. In this embodiment, the client then stores the data files that were selectively received by the client according to the content rating table.

In one embodiment, the client receives meta-data broadcasts from the server system that includes descriptions for a plurality of data files that are currently being broadcasted, as well. As an illustration, meta-data can be included as part of an Electronic Program Guide (EPG) or an Expended Program Information Signal (EPI).

In one embodiment, in response to a content rating table that is based on a user's profile and viewing habits, a data file is automatically selected for the user, when the user tunes to his or her personalized channel 214 (e.g. channel 99). The data file can be selected based upon the ratings and/or relevance of the data file in relation to the content rating table. The automatically selected data file can be, for example a currently broadcasting data file or a data file stored in a cache memory of the client 201. As previously discussed, data files can be stored in cache memory, based upon the content rating table, for later viewing by a user.

In one embodiment, process block 323 shows that the client 201 displays data files for channels selected by the user on the display device 219, and particularly, displays the automatically selected data file on the personalized channel 214 on the display device 219, when the personalized channel 214 is picked by user. Thus, the client 201 streams data files (e.g. television and movies) tailored to the individual's tastes from live and captured content on the personalized channel 214 to the display device 219, with no user interaction required, except to pick the personalized channel 214.

In one embodiment, process block 325 shows that the client then updates the meta-data table and content rating table if there are any user accesses of currently broadcasting data files or stored data files. For purposes of this disclosure, a user access may include a user interacting with, viewing, watching, listening to, reading, consuming, etc., a data file. For instance, one example of a user accessing a data file may be the user watching a particular movie or listening to a particular song provided by one of the stored data files in client. In one embodiment, a user access will result in the meta-data table and content rating table on the client being updated locally.

Figure 4:
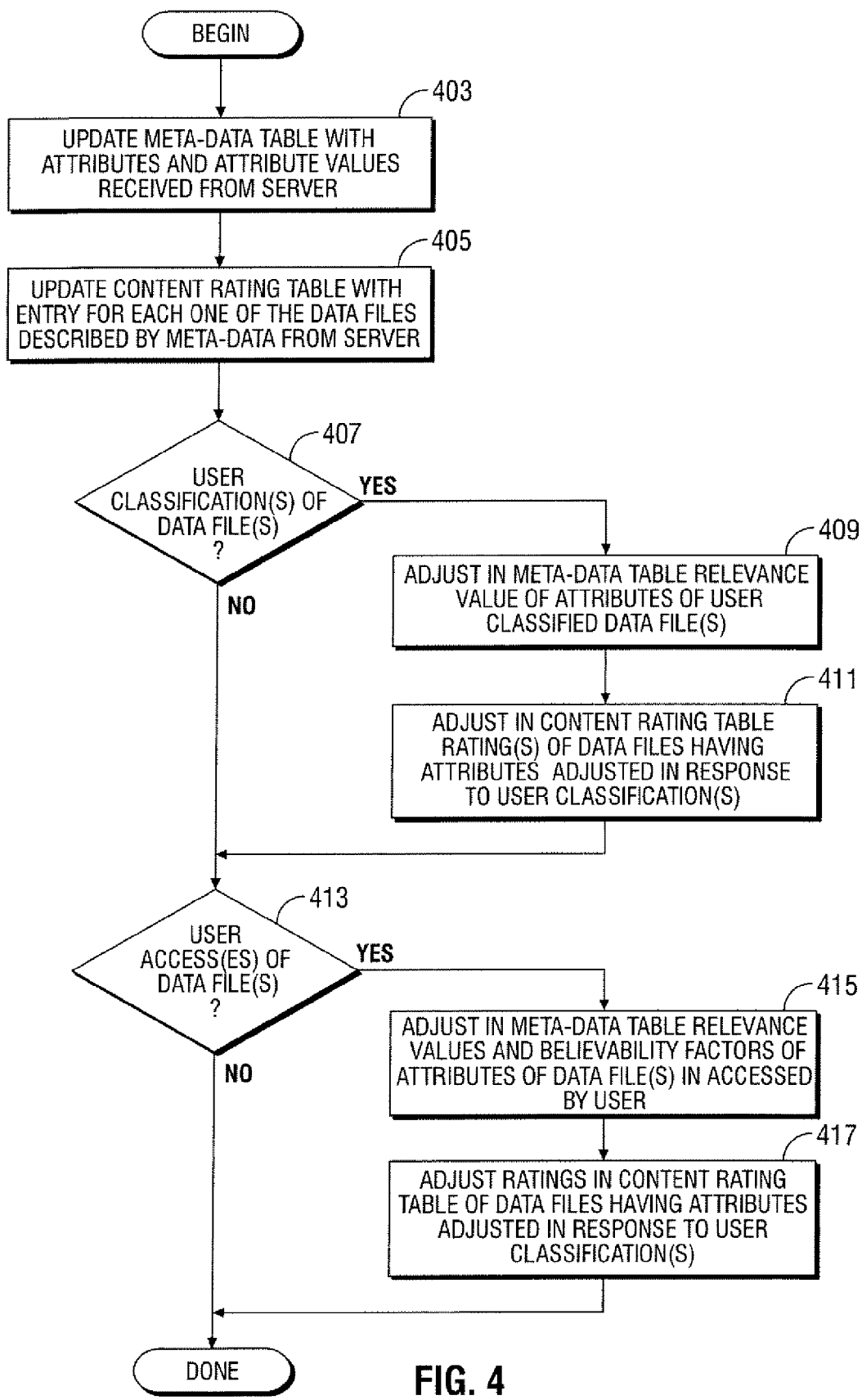
FIG. 4 is a flow diagram illustrating one embodiment of the flow of events in a client when processing meta-data broadcast from a server to maintain a meta-data table and content rating table in accordance with the teachings of the present invention.

FIG. 4 is a more detailed flow diagram illustrating one embodiment of the flow of events in a client when processing meta-data broadcasted from a server and updating and maintaining a meta-data table and a content rating table in accordance with the teachings of the present invention.

The meta-data table and content rating table create, what is often termed a user profile, which is based upon a user's past viewing history and preferences and is used to predict what sort of data files (e.g. televisions and movies) the user would likely want to watch. The meta-data table, content rating table, user profiles, etc. may be stored locally at the client 201 (e.g. in memory 205, storage 211, etc.) or elsewhere (e.g. as part of a LAN or WAN).

For example, the processor 203 of the client 201 may run instances of what is often termed a preference engine or relevance engine, to create and update the meta-data table and content rating table. However, this can also be done remotely such as, part of a LAN, WAN, etc. A preference or relevance engine can be used to track user selection of data files (i.e. the channels selected and the types of content of the data files) and to create the meta-data table and the content rating table, representing the user's viewing preferences. Thus, the client 201 has a "learning" capability for adjusting a user's viewing preferences. For example a user's viewing preferences may be categorized based on broadcast content and the associated programming attributes associated with a data file, such as the genre (e.g. action, sports, comedy, entertainment, drama, etc.) as well as, associated attributes assigned by the program guide such as titles of data files, actors, directors, writers, etc.

For example, the processor 203 can run instances of a preference or relevance engine to automatically select the data file for the user. For instance, in response to the meta-data table and the content rating table, the preference or relevance engine can rate or determine the relevance of data files and automatically select the highest rated or most relevant data file, which is then displayed on the personalized channel 214 on the display device 219 to the user, when the user picks the personalized channel. As previously discussed, the selected data file can be, for example, a currently broadcasting data file or a data file stored in a cache memory of the client. Thus, the client 201 can stream data files (e.g. television and movies) tailored to the individual's tastes from live and captured content on a personalized channel 214 to the display device 219, with no user interaction required, except to pick the personalized channel.

Although, some types of user profiles and preference engines are already known, the present invention provides, as will be discussed with reference to the following FIGS. 4-14, a novel meta-data table and content rating table (e.g. for use as a user profile) and novel methods of processing this type of data (e.g. based upon ratings, relevance, and believability) for automatically selecting data files (e.g. based upon a user's preferences) for storage and for viewing on a personalized channel 214, among other things.

Continuing with reference to FIG. 4, process block 403 shows that a meta-data table is updated with attributes and attribute values included in the meta-data broadcasted from the server. Process block 405 shows that the content rating table is then updated with an entry for each one of the data files described by the meta-data broadcast from the server.

In one embodiment, it is assumed that a meta-data table, a content rating table and a plurality of data files already exist in the client system. In one embodiment, the meta-data table, content rating table and plurality of data files may be stored and maintained in the client system in memory 205, storage 211 or by accessing a local network or the like with machine 201, as illustrated in the embodiment shown in FIG. 2.

To help illustrate the meta-data aspect of the present invention, FIG. 5 is an example of one embodiment of meta-data 501, which may be broadcast by the server 103 to the clients 105, 107 and 109. For explanation purposes, it is assumed that the data files broadcast by server 103 in this example are audio/video files such as for example movies or TV programming. As mentioned above, data files may be other types of files such as for example but not limited to audio, graphics, text, multi-media or the like.

In the illustrated embodiment, meta-data 501 in FIG. 5 shows that four movies, or data files, will be broadcast later by server 103. These movies shown in this example are "Action Dude," "The Funny Show," "Blast 'Em" and "Hardy Har Har." Meta-data 501 includes attributes and attribute values that describe each one of the movies to be broadcast later by server 103. In the example illustrated, two attributes are provided to describe each movie in meta-data 501. The attributes shown in FIG. 5 are "Actor" and "Genre." It is appreciated that other embodiment of the present invention may include different attributes as well as other attributes values. For instance, a non-exhaustive list of other attributes that may be used to describe movies may include "Director," "Year," "Effects," "Ending," etc. In one embodiment, for example, 40-50 different attributes are provided to describe movies in accordance with the teachings of the present invention.

Moreover, meta-data broadcasts from the server system can include descriptions for a plurality of data files that are currently being broadcasted or to be potentially broadcasted in the future. As an illustration, meta-data can be included as part of an Electronic Program Guide (EPG) or an Expanded Program Information Signal (EPI). This meta-data associated with EPGs and EPIs typically includes the name of the program, dates and times, movie rating, actors, genre (e.g. sports, action, comedy, drama, entertainment, news, etc), directors, writers, etc. Furthermore, EPIs often include information related to commercials, the expected life of content, additional information (e.g. website links for advertisers), etc. It should be appreciated that EPGs and EPIs and the types of information they contain are known in the art.

Referring back to the particular example shown in FIG. 5, "Action Dude" is an "action" movie featuring actor "Joe Smith." "The Funny Show" is "comedy" movie featuring actress "Jane Doe." "Blast 'Em" is an "action" movie featuring actor "Jane Doe." "Hardy Har Har" is a "comedy" movie featuring "Joe Smith."

To help illustrate the meta-data table aspect of the present invention, FIG. 6 is an example of one embodiment of meta-data table 601, which is updated and maintained locally by each client 105, 107 and 109. In the illustrated embodiment, meta-data table 601 in FIG. 6 has been populated with the data included in meta-data 501, which was broadcasted earlier from server 103. In one embodiment, meta-data table 601 includes a list of attributes, attribute values and corresponding relevance values and believability factors. In particular, meta-data table 601 includes attribute values "Joe Smith," "Jane Doe," "action," and "comedy." At this time, the relevance values and believability factors for attribute values "Joe Smith," "Jane Doe," "action," and "comedy" are all zero in FIG. 6. As will be shown, in one embodiment, the relevance values and believability factors of the present invention will be updated and maintained as the user interacts with the client system.

In one embodiment, the relevance values in meta-data table 601 are indicators as to how relevant the associated attribute and attribute values are for predicting a particular user's behavior. For instance, the relevance value indicates how likely it is for the user to watch a particular movie because of this particular attribute value. In one embodiment, relevance values in meta-data table 601 are within a range of values such as for example from −10 to 10. As will be discussed, the relevance value may be increased if for example the user watches a particular movie or at least expresses an interest in a particular movie having that particular attribute value. Conversely, the relevance value may be decreased if the user for example does not watch a particular movie or if the user explicitly indicates that he or she does not want to watch a particular movie having that particular attribute value.

In one embodiment, the believability factors in meta-data table 601 are weighting factors to be applied to specific attribute and attribute value pairs when rating or predicting whether a user will actually access a particular data file having that particular attribute value. In one embodiment, believability factors in meta-data table 601 are within a range of values such as for example from −10 to 10. In one embodiment, the believability factors may be increased for example when an attribute value accurately predicts a data file in which the user is interested. Conversely, the believability factors may be decreased when a user is interested in the data file, even though the particular attribute value indicates otherwise.

In one embodiment, meta-data table 601 entries are constructed from the aggregation of all meta-data 501 associated with potential content or data files to be broadcast from server 103. In one embodiment, entries in meta-data table 601 are updated based on explicit user requests. In addition, updates to meta-data table 601 may also be implicitly based on whether a user accesses specific data files having particular attribute values, independent of whether the user explicitly classifies a particular movie.

To help illustrate the content rating table aspect of the present invention, FIG. 7 is an example of one embodiment of a content rating table 701, which in one embodiment is updated and maintained locally by each client 105, 107 and 109. In the illustrated embodiment, content rating table 701 in FIG. 7 includes a list of the data files described in meta-data 501 as well as any additional data files that are currently stored or cached locally by the client.

In one embodiment, data files may be stored locally by the client in for example memory 205, storage 211 or in a locally accessible network by machine 201 of FIG. 2. For purposes of this disclosure, data files being stored locally by the client may also be interpreted to include a data file stored "locally" by the client in a known network storage configuration, separate from the server. For purposes of this disclosure, the data file being stored or cached locally by the client is to be interpreted as the data file being stored for later access, retrieval or consumption. In one embodiment, the local cache of the present invention is considered to be a first level cache. Thus, the local cache the present invention is sized accordingly to increase the possibility of a single hit.

Referring back to the continuing example of data files representing audio/video files, a movie is stored locally by the client. After a user watches the movie, the storage space occupied by the movie is generally considered to be available for storage of another movie to be broadcast sometime later. Thus, it is appreciated that the local cache of the client system is modeled as the single use system, e.g. fire and forget, in accordance with teachings of the present invention. In one embodiment, it is assumed that when a user accesses a data file, it is not likely that the user will want to access that same data file again. If a user has not watched a particular movie, the storage space occupied by that movie is generally considered not to be available for storage of another movie. However, if there is no additional storage space available and a higher rated movie is to be broadcast, the lower rated unwatched movie is replaced by the higher rated movie in accordance with the teachings of the present invention.

Referring back to the embodiment of content rating table 701 shown FIG. 7, each movie also has an associated rating, a rating type indicator, an in cache indicator and a next treatment indicator. In one embodiment, the rating indicates a rating value for the associated data file. The rating value in one embodiment may either be explicitly input by a user or implicitly generated by the client system by processing meta-data associated with that particular data file. In one embodiment, a relatively high rating value predicts that the particular data file may be of interest to the user. Conversely, in one embodiment, a relatively low rating value predicts that the particular data file is unlikely to be of interest to the user.

In one embodiment, the rating type indicator indicates whether the rating value of this particular data file was a result of explicit input from the user or if the rating value was implicitly generated by the client system. Thus, in one embodiment, the rating type indicator of content rating table 701 may be explicit, implicit or N/A if the data file or movie has not yet been rated. In one embodiment, if a data file has been explicitly classified by a user, the rating values of attribute values of the data file are no longer updated implicitly by the client system. However, if a data file has not yet been classified or has only been implicitly rated by the client system, the rating of the attribute values of the data file may be further updated or adjusted by the client system.

In one embodiment, the in cache indicator indicates whether that particular data file is currently stored or cached locally by the client. In the embodiment illustrated in FIG. 7, the movies "Action Dude," "The Funny Show" and "Blast 'Em" already exist in the local storage of the client system. Conversely, the movie "Hardy Har Har" has not been stored in the local storage of the client system in the example illustrated in FIG. 7.

In one embodiment, the next treatment indicator is used to track future actions to be taken for the particular data file. For example, if a movie has already been watched by the user, the next treatment indicator would indicate "replace" to indicate that the storage space occupied by that particular movie is available for storage of another movie. In one embodiment, if the movie has not yet been watched by the user, the next treatment indicator would indicate "keep." In one embodiment, if the movie has not been stored locally by the client and if the rating value predicts that this particular movie may be of interest to the user, the next treatment indicator would indicate "capture." In one of embodiment, if the movie has not yet been broadcast by the server and the rating predicts that this movie is unlikely to be of interest to the user, the next treatment indicator would indicate "ignore."

As was discussed back to FIG. 4, process blocks 403 and 405 show that the meta-data table and the content rating table are updated according to meta-data broadcast from the server. Decision block 407 shows that it is then determined whether there is a user classification of any of the data files. Referring briefly to FIG. 8, an example is shown where a user classifies some of the movies, as described by meta-data 501. In particular, the user has expressed interest in the movie "Action Dude" by indicating that he or she wishes to receive that movie. In this example, the user has expressed that he or she does not have any interest in the movie "The Funny Show" by indicating that he or she refuses that movie. In this example, the user has not provided any information or classification regarding any of the remaining movies.

Referring back to FIG. 4, if the user has classified any of the data files, process block 409 shows that the relevance values of the particular attributes of the classified data files are updated in meta-data table 601. Process block 411 shows that the ratings of data files having attribute values with relevance values that were adjusted in response to the user classification (s) are also adjusted. In one embodiment, if the user has not classified any data files, process blocks 409 and 411 are skipped.

To illustrate an example of when a user classifies data files, FIG. 9 shows a meta-data table 601 that is updated or adjusted in response to a user classification. In the example provided in FIG. 8, the user indicated that he or she was interested in the movie "Action Dude." Meta-data 501 in FIG. 5 shows that "Action Dude" features actor "Joe Smith" and is an "action" movie. Thus, referring to meta-data table 601 in FIG. 9, the relevance values for attribute values "Joe Smith" and "action" are adjusted to reflect that the user explicitly expressed an interest in "Action Dude." In one embodiment, the relevance values are increased to reflect that the user was interested. As will be discussed, in one embodiment, the believability factors associated with each attribute value are not updated until there is a user access of the data file having that particular attribute value.

Continuing with the example of FIG. 8, the user indicated that he or she was not interested in the movie "The Funny Show." Meta-data 501 in FIG. 5 shows that "The Funny Show" features actress "Jane Doe" and is a "comedy" movie. Thus, referring back to meta-data table 601 in FIG. 9, the relevance values for attribute values "Jane Doe" and "comedy" are adjusted to reflect that the user explicitly expressed that he or she was not interested in "The Funny Show." In one embodiment, the relevance values are decremented to reflect that the user was not interested.

Continuing with the example of FIG. 8, the user did not provide any information regarding the movies "Blast 'Em" and "Hardy Har Har." Accordingly, the relevance values of the attribute values associated with "Blast 'Em" and "Hardy Har Har" are not updated in meta-data table 601.

As will be discussed, in one embodiment, updates to the ratings in content rating table 701, as described in process block 411, are related to the relevance values and believability factors of the attribute values listed in meta-data table 601. A detailed description of the processing that occurs in process block 411 will be discussed below with a discussion of process block 417.

Referring back to FIG. 4, if the user accesses any of the data files, e.g. the user watches a movie, as determined in decision block 413, process block 415 shows that the relevance values and the believability factors of the particular attributes of the user accessed data files are updated in meta-data table 601. Process block 417 shows that the ratings of data files having attribute values with relevance values that were adjusted in response to the user access(es) are also adjusted. If the user has not accessed any data files, process blocks 415 and 417 are skipped.

To illustrate an example of a user accessing data files, assume that the user watches the movie "Action Dude." Meta-data 501 in FIG. 5 shows that "Action Dude" features actor "Joe Smith" and is an "action" movie. In one embodiment, each time a user accesses or interacts with particular data file, the believability factor of the attribute values of that film are adjusted or updated. In one embodiment, for attribute values having relevance values greater than zero, the believability factor for that attribute value is increased, since that attribute value accurately served as a predictor for a data file that the user would access. In one embodiment, for attribute values having relevance values less than zero, the believability factor for that attribute value is decreased, since that attribute value did not accurately serve as a predictor for a data file that the user would access. Therefore, FIG. 10 shows a meta-data table 601 that is updated or adjusted in response to the user access of "Action Dude." In this example, the believability factors of "Joe Smith" and "action" are increased since the relevance values for these attribute values were greater than zero.

In one embodiment, the relevance values associated with implicitly rated data files are also increased in meta-data table 601 in response to a user access. However, in the example shown in meta-data table 601 of FIG. 10, "Action Dude" was explicitly classified by the user. In one embodiment, the relevance values are not updated in meta-data table 601 in response to a user access of data files explicitly classified by the user.

FIG. 11 shows content rating table 701, which is updated in response to the user access of "Action Dude," as described in process block 417. As mentioned earlier, content rating table 701 is also updated as described in process block 411 in accordance with the teachings of the present invention. As shown in content rating table 701 of FIG. 11, "Action Dude" has a rating value of 1. The rating type of "Action Dude" is "explicit" because the user explicitly classified "Action Dude," as described above in connection with FIG. 8. The in cache indicator indicates that "Action Dude" is presently locally stored by the client system. The next treatment indicator indicates replace because the user has already watched "Action Dude."

In one embodiment, the rating values in content rating table 701 are determined as follows. Meta-data 501 shows that "Action Dude" has the attribute values "Joe Smith" and "action." Meta-data table 601 of FIG. 10 shows that "Joe Smith" has a relevance value of 1 and a believability factor of 1. Meta-data table 601 of FIG. 10 also shows that "action" has a relevance value of 1 and a believability factor of 1. In one embodiment, the rating value of a particular data file is determined considering all of the relevance values combined with their respective believability factors for all the attribute values of the data file. For instance, in one embodiment, the rating value for a data file is equal to the average of all of products of each relevance value and corresponding believability factor for the attribute values of the data file.

To illustrate, referring to "Action Dude" in content rating table 701 of FIG. 11, the product of the relevance value and believability factor of "Joe Smith" is 1*1, which equals 1. The product of the relevance value and believability factor of "action" is 1*1, which equals 1. The average of the products, 1 and 1, is 1. Therefore, the rating of "Action Dude" in content rating table 701 of FIG. 11 is 1.

Similarly, with regard to "Blast 'Em" in content rating table 701, "Blast 'Em" has the attribute values "Jane Doe" and "action." The relevance value and believability factors for "Jane Doe" in meta-data table 601 of FIG. 10 are −1 and 0, respectively. Thus, the rating of "Blast 'Em" in content rating table 701 is the average of 1*0 and 1*1, which equals 0.5. The ratings for "The Funny Show" and "Hardy Har Har" in content rating table 701 in the example shown in FIG. 11 are determined in a similar fashion in one embodiment of the present invention.

It is noted that since the user classified the movies "Action Dude" and "The Funny Show" above in FIG. 8, these movies have an explicit rating type as shown in content rating table 701 of FIG. 11. Since the user did not classify the movies "Blast 'Em" and "Hardy Har Har," these movies have an implicit rating in content rating table 701.

It is appreciated that the discussion above provides one example of how the rating values in content rating table 701 are determined in accordance with the teachings of the present invention. It is noted that ratings values may be determined in other ways in accordance with the teachings of the invention, which consider the relevance values and believability factors for each of the attribute values of a data file.

In one embodiment, the entry for next treatment in content rating table 701 is determined in part by the rating and in cache values for the particular data file. For example, assume in one embodiment that a rating of greater than zero indicates that the user is predicted to have at least some interest in that particular movie. Therefore, the movies "Blast 'Em" and "Hardy Har Har" may be of some interest to the user. Thus, the next treatment indicates that the movie "Blast 'Em" will be kept in storage and the movie "Hardy Har Har" will be captured when it is later broadcast by the server. As mentioned above, the movie "Action Dude" is marked for replacement in the next treatment field because it has already been watched by the user.

In one embodiment, future interactions by a user with the client system results in similar processing as described above. For instance, assume that the user now watches the movie "Blast 'Em." In this particular example, the user did not classify the movie "Blast 'Em" before watching the movie. In one embodiment, both of the relevance values and believability factors are updated for the attribute values of unclassified data files that are accessed, as shown in meta-data table 601 of FIG. 12. Recall from FIG. 5 that the movie "Blast 'Em" features "Jane Doe" and is an "action" movie. As shown in FIG. 10, the relevance value of "Jane Doe" was less than zero, or −1, prior to the user watching "Blast 'Em." Nevertheless, in this example, the user watched "Blast 'Em," despite the fact that it featured actress "Jane Doe." Accordingly, the believability factor of the "Jane Doe" attribute the value is adjusted downward since this particular attribute value now appears less likely or relevant when predicting a user's viewing habits. In one embodiment, since the relevance value is already less than zero, the believability factor is not adjusted further downward. However, the relevance value and believability factor for the attribute value "action" are adjusted upwards since "action" had a relevance value of greater than zero prior to the user watching "Blast 'Em." Thus, in this example, the relevance value is adjusted upwards from 1 to 2 and the believability factor is also adjusted upwards from 1 to 2. Therefore, the content rating table 601 of FIG. 12 now predicts that "action" movies are movies that the user is more likely to watch.

In one embodiment, each time the user interacts with the client system, the meta-data table 601 and the content rating table 701 are updated. Updates to be meta-data table 601 and content rating table 71 are performed when the user accesses data files as well as when the user explicitly classifies data files. It is appreciated that the user is not required to classify data files explicitly in order for the meta-data table 601 and content rating table 701 to be updated in accordance with the teachings of the present invention. As a result, the content rating table over time will more accurately predict data files in which the user is interested.

In one embodiment, the data files in which the user is predicted implicitly to be most interested as well as the data files in which the user explicitly classified an interest will be the data files that are cache locally on the client system. In effect, the television programs and movies that the user is most likely to want to watch are automatically stored locally, and therefore available "on demand," in accordance with teachings of the present invention without the user having to explicitly request these television programs and movies in advance or explicitly specify criteria used to identify the movies. Moreover, these data files can be automatically selected and displayed on the personalized channel 214 on the display device 219 to the user, as will be discussed.

As can be appreciated, by storing the data files locally on each client, broadcast bandwidth is utilized more efficiently in accordance with teachings of the present invention. Indeed, when a user watches a movie from the local storage of the client, no additional broadcast bandwidth is utilized. In addition, it is also appreciated that a substantial amount of the processing performed in a system according to the teachings of the present invention is performed on each of the client systems when updating their respective meta-data tables and content rating tables. This distributed processing of the present invention enables the presently disclosed broadcast system to scale across a very large number of users since the incremental cost to the server for each additional client is zero.

In another embodiment, ratings values such as for example those generated in the content rating tables maintained and updated by client systems of the present invention may be used to determine broadcast content and schedules of a server in accordance with teachings of the present invention. For instance, assume a broadcast system such as for example the one described above in FIG. 1B. As shown in the depicted embodiment, server 103 broadcasts information to a plurality of clients 105, 107 and 109. In the depicted embodiment, each client 105, 107 and 109 also includes a communications link 121, 123 and 125, respectively, back to server 103. In one embodiment, the communications links 121, 123 and 125 are used by server 103 to receive ratings from each client 105, 107 and 109, respectively. In one embodiment, the ratings received from each client are generated in a manner similar to that discussed above. In one embodiment, server 103 includes processing that aggregates the ratings received from each client and is therefore able to identify the most highly rated data files. In one embodiment, server 103 then broadcasts the most highly rated data files. In one embodiment, the order or time in which server 103 broadcasts the data files is determined at least in part by the aggregated ratings received from each of the clients.

In one particular embodiment of the present invention, a method, apparatus, and machine-readable medium for automatically delivering data files (e.g. television and movies) via a personalized channel 214 to the user, that are based on a user's profile and viewing habits, are provided. The personalized channel 214 is displayed on a display device 219 to the user. This enables a passive viewing experience for the end-user. The user only needs to tune to his or her personalized channel (e.g. channel 99) to view personalized content synthesized from all of available content sources available to the user.

For example, in one embodiment, a client 201 (e.g. a set-top box, personal computer etc.) receives meta-data broadcasts from a server system that includes descriptions of a plurality of data files currently being broadcasted or to be broadcast by the server system. As an illustration, meta-data can be included as part of an Electronic Program Guide (EPG) or an Expended Program Information Signal (EPI). In response to a content rating table that is based on a user's profile and viewing habits, a data file is automatically selected for the user. As previously discussed, data files are rated in response to a content rating table and meta-data tables. The data file can be selected based upon the ratings and/or relevance of the data file in relation to the content rating table. Particularly, the data file with the highest rating is automatically selected. The automatically selected data file is displayed on the personalized channel 214 on a display device 219 to the user, when the user picks or tunes to the personalized channel (e.g. channel 99).

The selected data file can be, for example, a currently broadcasting data file or a data file stored in a cache memory (e.g. memory 205, storage 211, etc.) of the client 201. As previously discussed, data files can be stored in cache memory for the user. The stored data files are selected based upon their ratings and the data file is stored in a cache memory to thereby create a stored data file. In one embodiment, the client 201 compares the ratings of the currently broadcasting data files and the stored data files, and based upon the ratings, the highest rated currently broadcasting data file or stored data file is automatically selected for display on the personalized channel 214. Thus, the client 201 can stream data files (e.g. television and movies) tailored to the individual user's tastes from live and captured content on the personalized channel 214 to the display device 219 for viewing by the user, with no user interaction required, except to pick the personalized channel. Moreover, targeted advertisements based on user preferences can be shown on the personalized channel 214 to the user.

Figure 13:
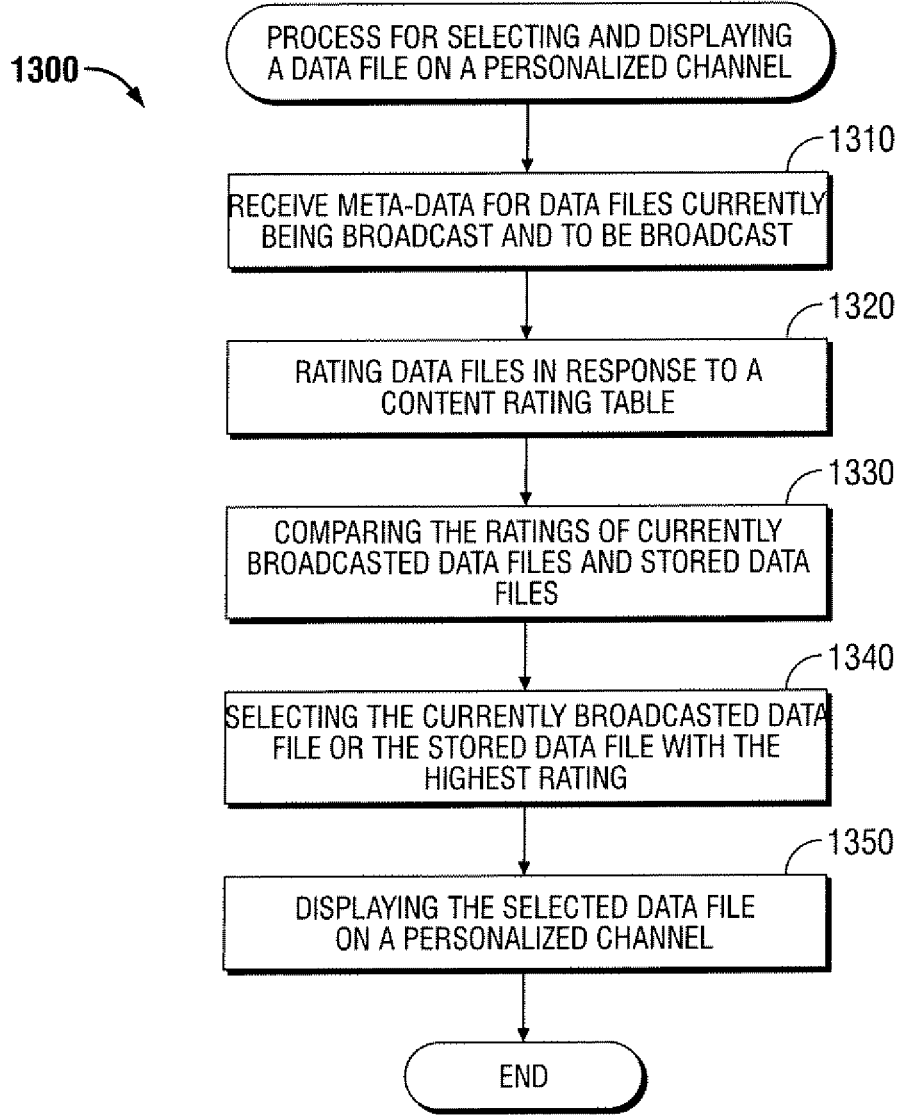
FIG. 13 is a flow diagram illustrating one embodiment of a process for selecting and displaying a data file on a personalized channel.

FIG. 13 is a flow diagram illustrating one embodiment of a process 1300 for selecting and displaying a data file on a personalized channel. The process 1300 can be implemented by the client 201 to display the personalized channel 214 (e.g. channel 99) on the display device 219, as previously discussed.

At block 1310, the client 201 receives meta-data for data files currently being broadcasted and to be broadcast from the server 103. Next, at block 1320, the client 201 (e.g. utilizing a processor 203) performs processing (e.g. including relevance or preference processing) to rate data files in response to a content rating table, as previously discussed. At block 1330, the ratings of the currently broadcasted data files and the stored data files are compared. The currently broadcasted data file or the stored data file with the highest rating is then automatically selected (block 1340). The selected data file is then displayed on a personalized channel 214 for display on a display device 219 to the user, when the user picks or tunes to the personalized channel (e.g. channel 99).

Figure 14:
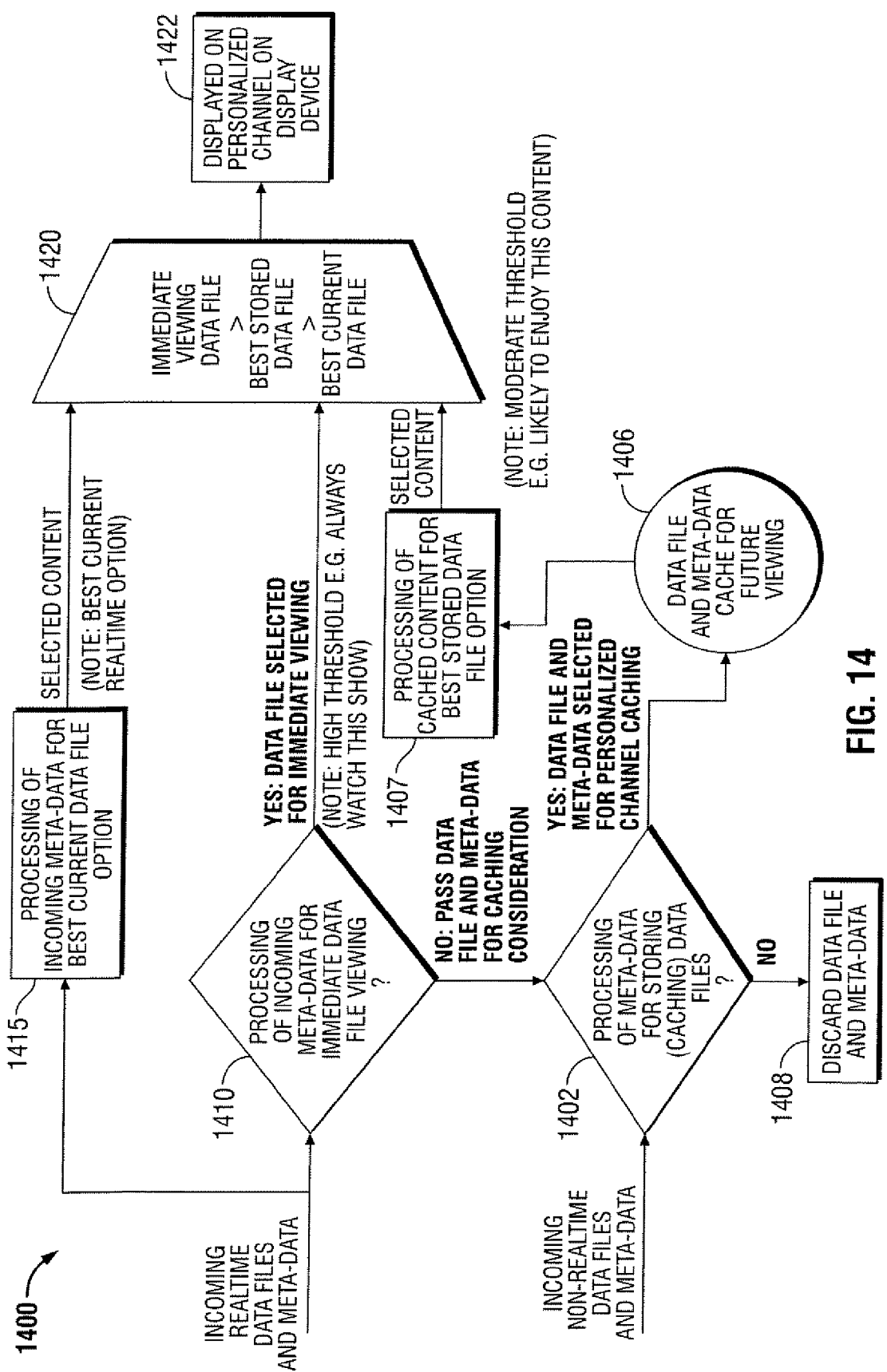
FIG. 14 is a flow diagram illustrating another, more detailed, embodiment of a process for selecting and displaying a data file on a personalized channel.

FIG. 14 is a flow diagram illustrating another, more detailed, embodiment of a process 1400 for selecting and displaying a data file on a personalized channel. The process 1400 can be implemented by the client 201 to display the personalized channel 214 (e.g. channel 99) on the display device 219, as previously discussed.

At block 1402, the client 201 (e.g. utilizing a processor 203) processes incoming non-real time data files and meta-data, at a time prior to the current broadcast time (e.g. including relevance or preference processing) to rate data files in response to a content rating table, as previously discussed. If the meta-data associated with a data file achieves a moderate threshold rating then the data file and the meta-data is automatically selected for potential viewing on the personalized channel 214 and is cached or stored in memory (e.g. memory 205 or storage 211) at process block 1406. At block 1407, the stored data file is processed as a best stored data file option and is forwarded to decision block 1420. Generally, the best stored data file option satisfies a moderate threshold, e.g. a user is likely to enjoy the content. If the meta-data associated with a data file does not achieve a moderate threshold rating then the data file and meta-data is automatically discarded at block 1408. Moreover, the process 1400 may delete cached data files based on size, relevance based on time, e.g. news vs. movies, etc.

At block 1410, the client 201 (e.g. utilizing a processor 203) processes incoming real time data files and meta-data (e.g. including relevance or preference processing) to rate data files in response to a content rating table, as previously discussed. If the meta-data associated with the data file achieves a sufficiently high threshold rating, the data file is designated as an immediate viewing data file and is automatically forwarded to decision block 1420. For example, immediate viewing data files have very high threshold ratings based on the content rating table, e.g. a user always watches Monday Night Football at 8:00 PM. Therefore, the personalized channel 214 will almost always display this data file at 8:00 pm on Monday nights. On the other hand, if the meta-data associated with the data file does not achieve a sufficiently high threshold rating, the data file is sent to decision block 1402 for caching consideration, as previously discussed.

At block 1415, the client 201 (e.g. utilizing a processor 203) processes incoming real time data files and meta-data (e.g. including relevance or preference processing) to determine a best current data file option. The best current data file option is forwarded to decision block 1420. The best current data file is the best guess of the process 1400 as to which data file the user would likely want to view notwithstanding any highly relevant immediate viewing data files or moderately relevant stored data files.

At decision block 1420, one of the immediate viewing data file, the stored data file, or the best current data file option is selected. In one embodiment, the immediate viewing data file is given priority over the stored data file and the stored data file is given priority over the best current data file option. Thus, if the immediate viewing data file is available, it is automatically selected for display on the personalized channel 214 on the display device 219 (block 1422). However, if the immediate viewing data file is not available, and a best stored data file option is available, then the best stored data file option is automatically selected for display on the personalized channel 214 on the display device 219 (block 1422). If neither an immediate viewing data file or a best stored data file option is available, then the best current data file option is automatically selected for display on the personalized channel 214 on the display device 219 (block 1422). Thus, the client 201 can stream data files (e.g. television and movies) tailored to the individual's tastes from live and captured content on the personalized channel 214 to the display device 219, with no user interaction required, except to tune to the personalized channel (e.g. channel 99).

The embodiments of the present invention and their various functional components can be implemented in hardware, software, firmware, middleware or a combination thereof and utilized in systems, subsystems, components, or sub-components thereof. When implemented in software, these embodiments are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a client, a processor, a computer, etc.). Examples of the machine/processor-readable medium include an electronic circuit, a semiconductor memory device, a ROM, a flash memory, an erasable programmable ROM (EPROM), a floppy diskette, CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method implemented by a client terminal, comprising:
   receiving meta-data broadcast from a server system at the client terminal, the meta-data including descriptions of a plurality of programs currently being broadcasted by the server system;
   rating previously broadcasted programs based on meta-data associated with the previously broadcasted programs, respectively, at the client terminal, in response to a content rating table, wherein the content rating table includes at least a rating value and a rating type for broadcasted programs, wherein the rating value is the combination of a relevance value and a believability factor, the relevance value corresponding to a likelihood that a user will want to watch the previously broadcasted program based on the descriptions of the meta-data and the believability factor is a weighting factor corresponding to the accuracy of past relevance value determinations, and the rating type indicates whether the rating value was generated explicitly based upon prior explicit input from the user or implicitly generated without prior explicit input from the user;
   storing previously broadcasted programs meeting a predetermined ranking threshold in a storage device at the client terminal to create a plurality of stored previously broadcast programs;
   comparing the rankings of the plurality of stored previously broadcast programs to determine a best stored program at the client terminal;
   rating currently broadcasted programs being received at the client terminal in response to the content rating table;
   comparing the rankings of currently broadcasted programs to determine a best currently broadcasted program at the client terminal;
   comparing the rankings of the best currently broadcasted program and the best stored program at the client terminal;
   selecting either the best currently broadcasted program or the best stored program determined to have the highest ranking; and
   displaying the selected best currently broadcasted program or the best stored program automatically on a personalized channel on a display device.

2. The method of claim 1 wherein the best currently broadcasted program is automatically selected.

3. The method of claim 2 wherein if neither a best currently broadcasted data file or a best stored program is selected then the currently broadcasted program with the highest ranking is selected.

4. The method of claim 1 wherein the meta-data comprise at least one of video information, graphical information, audio information, multi-media information or textual information.

5. A client terminal, comprising:
a processor having circuitry to execute instructions;
a communications interface coupled to the processor, the communications interface coupled to receive programs currently being broadcasted and meta-data from a server system; and
a storage device coupled to the processor, the storage device having sequences of instructions stored therein, which when executed by the processor cause the processor to:
rate previously broadcasted programs based on meta-data associated with the previously broadcasted programs, respectively, in response to a content rating table, wherein the content rating table includes at least a rating value and a rating type for broadcasted programs, wherein the rating value is the combination of a relevance value and a believability factor, the relevance value corresponding to a likelihood that a user will want to watch the previously broadcasted program based on the descriptions of the meta-data and the believability factor is a weighting factor corresponding to the accuracy of past relevance value determinations, and the rating type indicates whether the rating value was generated explicitly based upon prior explicit input from the user or implicitly generated without prior explicit input from the user;
store previously broadcasted programs meeting a pre-determined ranking threshold in the storage device to create a plurality of stored previously broadcast programs;
compare the rankings of the plurality of stored previously broadcast programs to determine a best stored program;
rate currently broadcasted programs being received at the client terminal in response to the content rating table;
compare the rankings of currently broadcasted programs to determine a best currently broadcasted program;
compare the rankings of the best currently broadcasted program and the best stored program at the client terminal;
select either the best currently broadcasted program or the best stored program determined to have the highest ranking; and
display the selected best currently broadcasted program or the best stored program automatically on a personalized channel on a display device.

6. The apparatus of claim 5 wherein the best currently broadcasted program is automatically selected.

7. The apparatus of claim 6 wherein if neither a best currently broadcasted program or a best stored program is selected then the currently broadcasted program with the highest ranking is selected.

8. The apparatus of claim 5 wherein the meta-data comprise at least one of video information, graphical information, audio information, multi-media information or textual information.

9. A machine-readable non-transitory medium of a storage device having instructions tangibly stored thereon executed by a processor of a client terminal to cause the processor to:
receive meta-data broadcast from a server system at the client terminal, the meta-data including descriptions of a plurality of programs currently being broadcasted by the server system;
rate previously broadcasted programs based on meta-data associated with the previously broadcasted programs, respectively, in response to a content rating table, wherein the content rating table includes at least a rating value and a rating type for broadcasted programs, wherein the rating value is the combination of a relevance value and a believability factor, the relevance value corresponding to a likelihood that a user will want to watch the previously broadcasted program based on the descriptions of the meta-data and the believability factor is a weighting factor corresponding to the accuracy of past relevance value determinations, and the rating type indicates whether the rating value was generated explicitly based upon prior explicit input from the user or implicitly generated without prior explicit input from the user;
store previously broadcasted programs meeting a pre-determined ranking threshold in a storage device at the client terminal to create a plurality of stored previously broadcast programs;
compare the rankings of the plurality of stored previously broadcast programs to determine a best stored program;
rate currently broadcasted programs being received at the client terminal in response to the content rating table;
compare the rankings of currently broadcasted programs to determine a best currently broadcasted program;
compare the rankings of the best currently broadcasted program and the best stored program;
select either the best currently broadcasted program or the best stored program determined to have the highest ranking; and
display the selected best currently broadcasted program or the best stored program automatically on a personalized channel on a display device.

10. The machine-readable non-transitory medium of claim 9 wherein the best currently broadcasted program is automatically selected.

11. The machine-readable non-transitory medium of claim 10 wherein if neither a best currently broadcast program or a best stored program is selected then the currently broadcasted program with the highest ranking is selected.

* * * * *